US009350691B2

(12) United States Patent
Morisaki et al.

(10) Patent No.: US 9,350,691 B2
(45) Date of Patent: May 24, 2016

(54) INFORMATION PROCESSING SYSTEM, LINKAGE SERVER, AND INFORMATION PROCESSING METHOD

(75) Inventors: Mitsunori Morisaki, Tokyo (JP); Masahiro Takei, Tokyo (JP); Yohei Hirokawa, Tokyo (JP); Kazuhiro Okanoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 601 days.

(21) Appl. No.: 13/703,609

(22) PCT Filed: May 24, 2011

(86) PCT No.: PCT/JP2011/002880

§ 371 (c)(1),
(2), (4) Date: Dec. 11, 2012

(87) PCT Pub. No.: WO2011/158440

PCT Pub. Date: Dec. 22, 2011

(65) Prior Publication Data

US 2013/0086193 A1    Apr. 4, 2013

(30) Foreign Application Priority Data

Jun. 14, 2010    (JP) ................................. 2010-135519

(51) Int. Cl.
*G06F 15/16*    (2006.01)
*H04L 12/58*    (2006.01)
*G06Q 10/06*    (2012.01)

(52) U.S. Cl.
CPC ............... *H04L 51/06* (2013.01); *G06Q 10/06* (2013.01)

(58) Field of Classification Search
CPC ................................ H04L 51/06; G06Q 10/06
See application file for complete search history.

(56) References Cited

U.S. PATENT DOCUMENTS

| 7,444,596 B1* | 10/2008 | Cope et al. .................... 715/764 |
| 2002/0103666 A1* | 8/2002 | Hanai et al. ...................... 705/1 |
| 2007/0192166 A1* | 8/2007 | Van Luchene .................. 705/10 |
| 2009/0076795 A1* | 3/2009 | Bangalore et al. ................. 704/9 |

(Continued)

FOREIGN PATENT DOCUMENTS

| JP | 09-200254 A | 7/1997 |
| JP | 2001-325188 A | 11/2001 |
| JP | 2002-222306 A | 8/2002 |

(Continued)

OTHER PUBLICATIONS

International Search Report in PCT/JP2011/002880 dated Aug. 9, 2011(English Translation Thereof).

*Primary Examiner* — Jonathan Bui
(74) *Attorney, Agent, or Firm* — McGinn IP Law Group, PLLC

(57) ABSTRACT

An information processing system 1 includes an acquiring unit 20 that acquires business-operation information in response to a request from a mobile terminal 10, a storage unit 30 that stores plural preset text messages, a selection unit 40 that selects a preset text message corresponding to the business-operation information acquired by the acquiring unit 20 from among the plural preset text messages, a determining unit 50 that determines a message destination corresponding to the business-operation information acquired by the acquiring unit 20, and a transmitting unit 60 that transmits the preset text message selected by the selection unit 40 to the message destination determined by the determining unit 50.

18 Claims, 18 Drawing Sheets

(56) References Cited

U.S. PATENT DOCUMENTS

2009/0292764 A1* 11/2009 Kamen et al. ............... 709/203
2011/0211679 A1* 9/2011 Mezhibovsky et al. .... 379/88.18

FOREIGN PATENT DOCUMENTS

| JP | 2002-259300 A | 9/2002 |
| JP | 2004-064493 A | 2/2004 |

* cited by examiner

FIG. 6

| USER ID FOR BUSINESS-OPERATION SERVER | USER ID FOR TEXT MESSAGE SERVER | USER ID FOR VOICE SERVER | MOBILE TERMINAL INFORMATION | LOG IN |
|---|---|---|---|---|
| 1000 | user1000 | 1000@aaa.bbb.ccc |  | ○ |
| 1020 | user-A | 2000@aaa.bbb.ccc | 192.168.0.105 | ○ |
| 1050 | user-test | 3000@aaa.bbb.ccc |  | × |
| 1100 | user_DD | 5000@aaa.bbb.ccc | 192.168.0.100 | ○ |

| MESSAGE ID | TEXT MESSAGE INFORMATION | STATUS FLAG |
|---|---|---|
| REF-0001 | IS THERE ANY STOCK? | 1 |
| REF-0002 | PLEASE SEND IT. | 2 |
| REF-0003 | PLEASE ARRANGE DISTRIBUTION. | 1 |
| REF-0004 | PLEASE DELIVER IT. | 0 |
| REF-0005 | PLEASE LET ME KNOW PROGRESS OF OPERATION. | 1 |

FIG. 12

INFORMATION PROCESSING SYSTEM, LINKAGE SERVER, AND INFORMATION PROCESSING METHOD

TECHNICAL FIELD

The present invention relates to an information processing technique for collecting information to perform business operations.

BACKGROUND ART

Patent Document 1 discloses a technique of collecting information using a mobile terminal to carry out business operations while communicating with servers. In particular, Patent Document 1 discloses a technique in which sales clerks operate operation terminals in a train, and access a server through a wireless LAN repeater to communicate information concerning products.

RELATED DOCUMENT

Patent Document

Patent Document 1: Japanese Patent Application Laid-open No. 2004-64493

SUMMARY OF THE INVENTION

However, with the technique described in Patent Document 1 described above, message transmission cannot be performed in a simple manner using operation terminals for performing business operations. When wishing to consult a person in charge using text messages to solve a problem occurring during business operations, the sales clerk needs to narrow down a possible cause of the problem, find a contact destination, and type a message using a mobile phone or computer, which require lots of efforts.

An object of the present invention is to solve the conventional problems described above.

In each aspect of the present invention, the following configurations are employed to solve the problems described above.

A system according to a first aspect of the present invention includes an acquiring unit that acquires business-operation information in response to a request from a mobile terminal; a storage unit that stores plural preset text messages; a selection unit that selects a preset text message corresponding to the business-operation information acquired by the acquiring unit from among the plural preset text messages; a determining unit that determines a message destination corresponding to the business-operation information acquired by the acquiring unit; and a transmitting unit that transmits the preset text message selected by the selection unit to the message destination determined by the determining unit.

A linkage server according to a second aspect of the present invention includes a selection unit that acquires business-operation information, and selects a preset text message corresponding to the acquired business-operation information from among a plurality of preset text messages stored in advance; a determining unit that determines a message destination corresponding to the business-operation information; and a generating unit that generates a message transmission screen for transmitting the preset text message selected by the selection unit to the message destination determined by the determining unit.

An information processing method according to a third aspect of the present invention is performed by at least one computer and includes acquiring business-operation information; selecting a preset text message corresponding to the acquired business-operation information from among a plurality of preset text messages stored in advance; determining a text-message destination using at least a part of the acquired business-operation information; and transmitting the selected preset text message to the determined destination.

A computer readable storage medium according to a fourth aspect of the present invention stores a program for causing a computer to acquire business-operation information; select a preset text message corresponding to the acquired business-operation information from among a plurality of preset text messages stored in advance; determine a text-message destination using at least a part of the acquired business-operation information; and transmit the selected preset text message to the determined destination. Another aspect of the present invention may include the program stored in the storage medium according to the fourth aspect of the present invention.

EFFECTS OF THE INVENTION

According to aspects of the present invention, it is possible to rapidly and effectively communicate text messages with a required person while performing business operations.

BRIEF DESCRIPTION OF THE DRAWINGS

FIG. 6 is a diagram illustrating information registered in a user information unit of a linkage server in the information processing system as the second exemplary embodiment according to the present invention.

FIG. 11 is a diagram illustrating preset text message data in a text message server in the information processing system as the second exemplary embodiment according to the present invention.

FIG. 12 is a diagram illustrating a screen transition example of a second application example according to the present invention.

DESCRIPTION OF EMBODIMENTS

Hereinbelow, with reference to the drawings, exemplary embodiments of the present invention will be described in detail as typical examples. Constituent elements described in the following exemplary embodiments are merely examples, and it is not intended to limit the technical scope of the present invention to the constituent elements described in the following exemplary embodiments.

[First Exemplary Embodiment]

Figure 1:
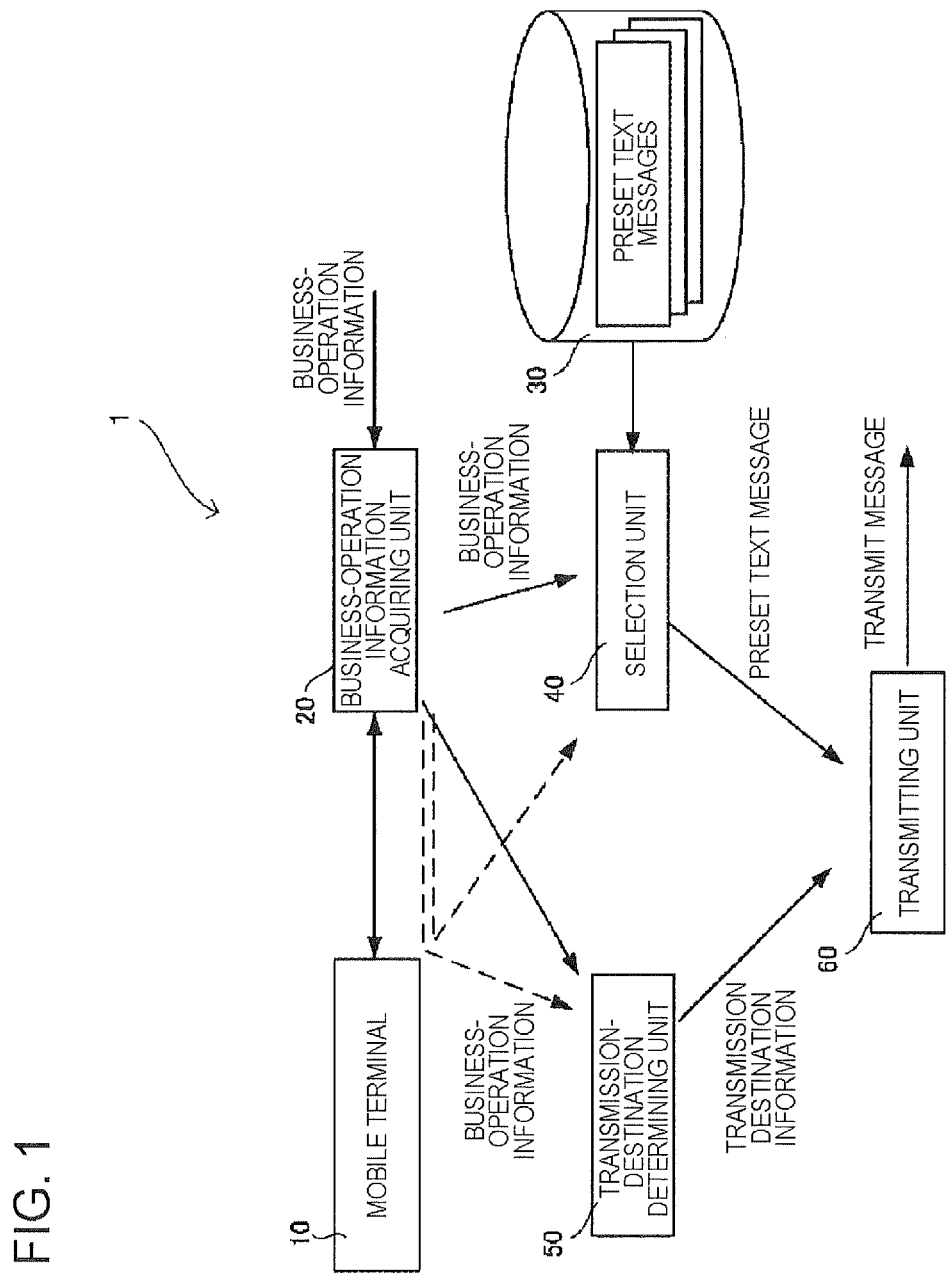
FIG. 1 is a schematic view illustrating an information processing system as a first exemplary embodiment according to the present invention.

FIG. 1 is a schematic view illustrating an information processing system 1 as a first exemplary embodiment according to the present invention. In FIG. 1, the information processing system 1 includes a business-operation information acquiring unit 20 that acquires business-operation information in response to a request from a mobile terminal 10, and a storage unit 30 that stores plural preset text messages. Further, the information processing system 1 includes a selection unit 40 that selects a preset text message corresponding to the business-operation information from among plural preset text messages stored in the storage unit 30, and a destination determining unit 50 that determines a message destination corresponding to the acquired business-operation information. Yet further, the information processing system 1 includes a transmitting unit 60 that transmits the preset text message selected by the selection unit 40 to the message destination determined by the destination determining unit 50.

With the configuration in which a preset text message is read out and used on the basis of the business-operation information as described above, it is possible to simplify communication of text message in business operation situations, thereby improving the efficiency in the business operations.

It should be noted that, as shown by the dotted line, the business-operation information acquiring unit 20 may transmit the business-operation information through the mobile terminal 10 to the selection unit 40 or destination determining unit 50.

[Second Exemplary Embodiment]

Figure 2:
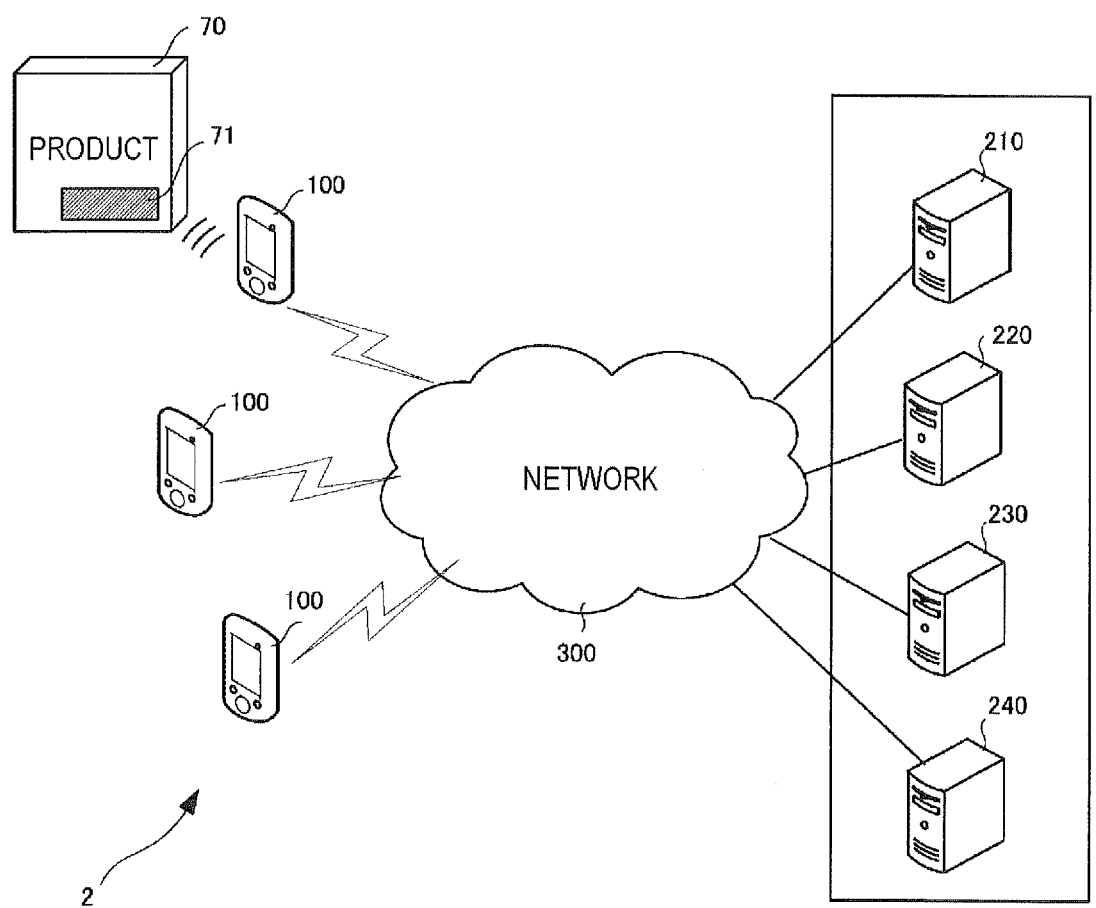
FIG. 2 is a schematic view illustrating an information processing system as a second exemplary embodiment according to the present invention.

FIG. 2 is a schematic view illustrating an information processing system 2 as a second exemplary embodiment according to the present invention. The information processing system 2 illustrated in FIG. 2 includes plural mobile terminals 100 connected through a network 300 to a business-operation server 210, a linkage server 220, a text message server 230, and a voice server 240. Each of the mobile terminals 100 has a function of reading a tag 71 such as a bar code or RFID attached to a product 70, and uses the collected information to access the business-operation server 210 and acquire necessary information.

Figure 3:
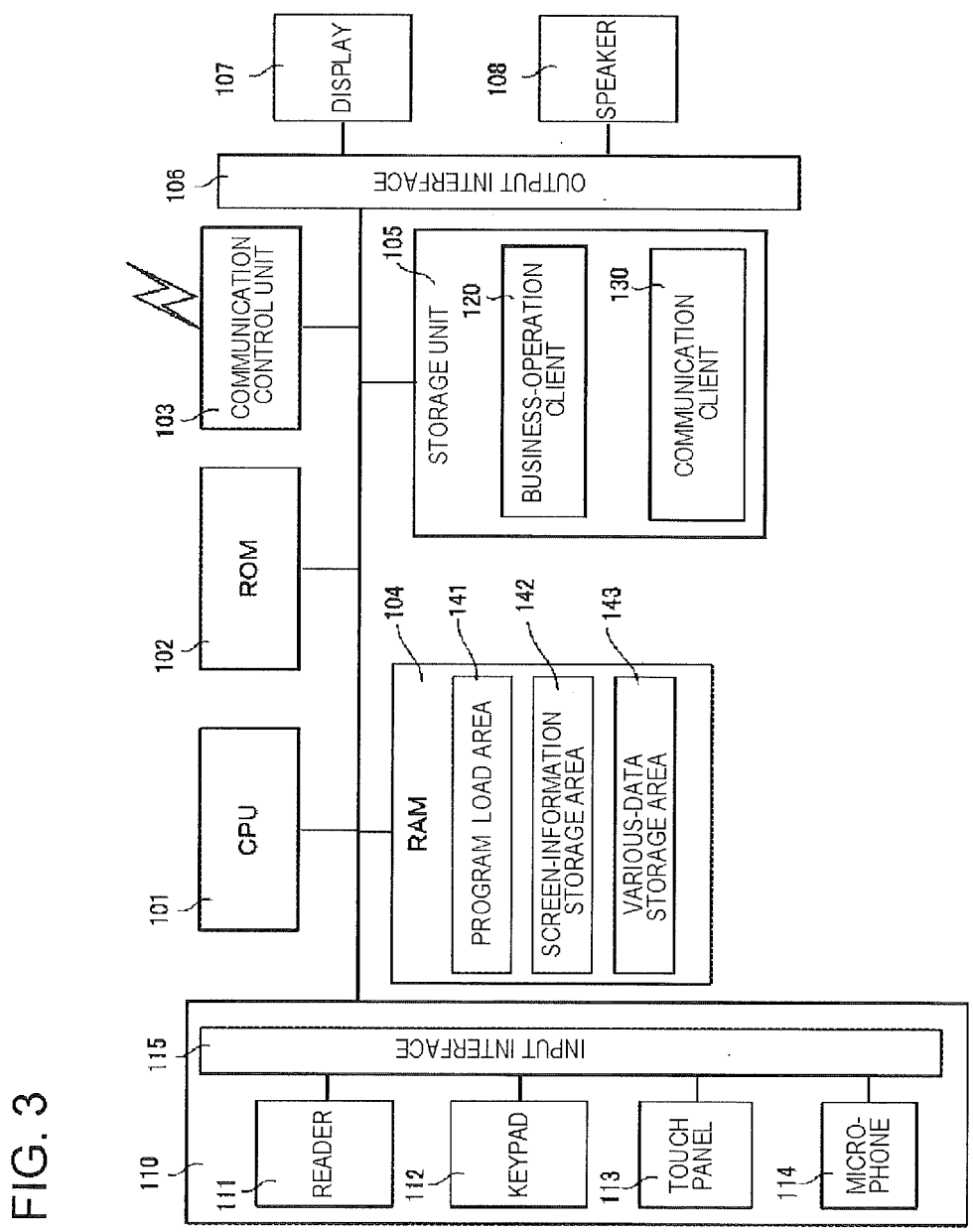
FIG. 3 is a diagram illustrating a hardware configuration of a mobile terminal according to the second exemplary embodiment of the present invention.

FIG. 3 is a diagram illustrating a configuration of the inside of the mobile terminal 100. The mobile terminal 100 includes a CPU 101, a ROM 102, a communication control unit 103, a RAM 104, a storage unit 105, an output interface 106, a display 107, a speaker 108, and an input unit 110. The CPU 101 is a central processing unit, and controls the entire mobile terminal 100 by running various programs.

The ROM 102 is a read-only memory, and stores a boot program that the CPU 101 is required to first run, and various parameters. The communication control unit 103 controls communication with various servers through the network. The RAM 104 is a random access memory, and includes, for example, a program load area 141, a screen-information storage area 142, and a various-data storage area 143. The storage unit 105 stores a business-operation client (application) 120 and a communication client (application) 130.

Images and voices, which the CPU 101 generates through running programs, are outputted through the output interface 106 from, for example, the display 107 or speaker 108.

The input unit 110 includes a reader 111, a keypad 112, a touch panel 113, a microphone 114, and an input interface 115 that transfers inputs from these units to the CPU 101. In this exemplary embodiment, the reader 111 is a bar code reader as an example. However, the reader 111 may be an RFID tag reader or other reader.

Figure 4:
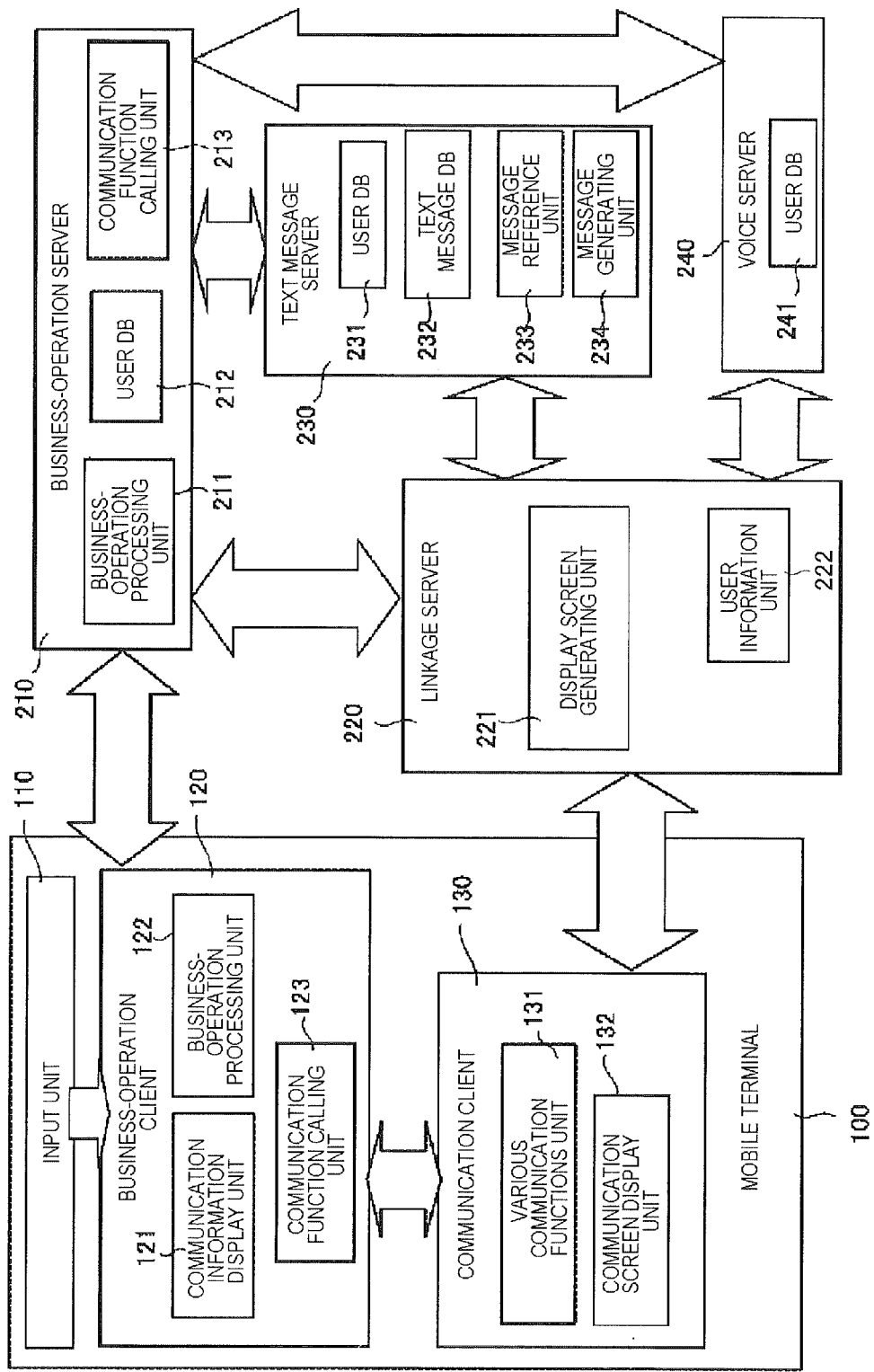
FIG. 4 is a diagram illustrating a process configuration of the information processing system as the second exemplary embodiment according to the present invention.

FIG. 4 is a diagram illustrating a process configuration of the information processing system 2 according to this exemplary embodiment. As illustrated in FIG. 4, the mobile terminal 100 includes the input unit 110, the business-operation client 120, and the communication client 130.

The business-operation client 120 includes a communication information display unit 121 for displaying communication information (for example, information indicating the presence or absence of incoming call history and information concerning reception of a text message) on a business-operation screen. Further, the business-operation client 120 includes a business-operation processing unit 122 that processes business operations with the business-operation server 210, and a communication function calling unit 123 that calls up each function in the communication client 130.

The communication client 130 includes a various communication functions unit 131 and a communication screen display unit 132. The various communication functions unit 131 includes, for example, a phoning control function, a phone function, a new incoming call display control function, an incoming call display control function, a message display control function, and a telephone setting control function.

In association with the mobile terminal 100 having the configuration as described above, the business-operation server 210 includes a business-operation processing unit 211, a user database 212, and a communication function calling unit 213, and functions as a business-operation information acquiring unit. In this exemplary embodiment, the user database 212 is used for registering users who can log in to the business-operation server 210 to receive services for business operations. More specifically, user IDs and passwords are registered.

The linkage server 220 includes a display screen generating unit 221, and a user information unit 222. The display screen generating unit 221 generates a screen that is to be displayed on the display 107 of the mobile terminal 100, and transfers it to the mobile terminal 100. The generated screen operates in a manner such that a business-operation system (the business-operation client 120 and the business-operation server 210) and a communication system (the communication client 130, the text message server 230, and the voice server 240) are associated with each other.

The text message server 230 includes a user database 231, a text message database 232, a message reference unit 233, and a message generating unit 234. The user database 231 is used for registering users who can log in to the text message server 230 to receive services for business operations. More specifically, user IDs and passwords are registered. The message reference unit 233 stores preset text messages corresponding to business operations.

The display screen generating unit 221 generates a text message generation screen, which is displayed, for example, in an overlapped manner with the screen for business operations on the basis, for example, of user information read out from the user information unit 222 or preset text message received from the message reference unit 233.

The voice server 240 is, for example, a SIP server, and includes a user database 241 for registering users who can use a calling function or log in to receive a voice communication service.

Figure 5:
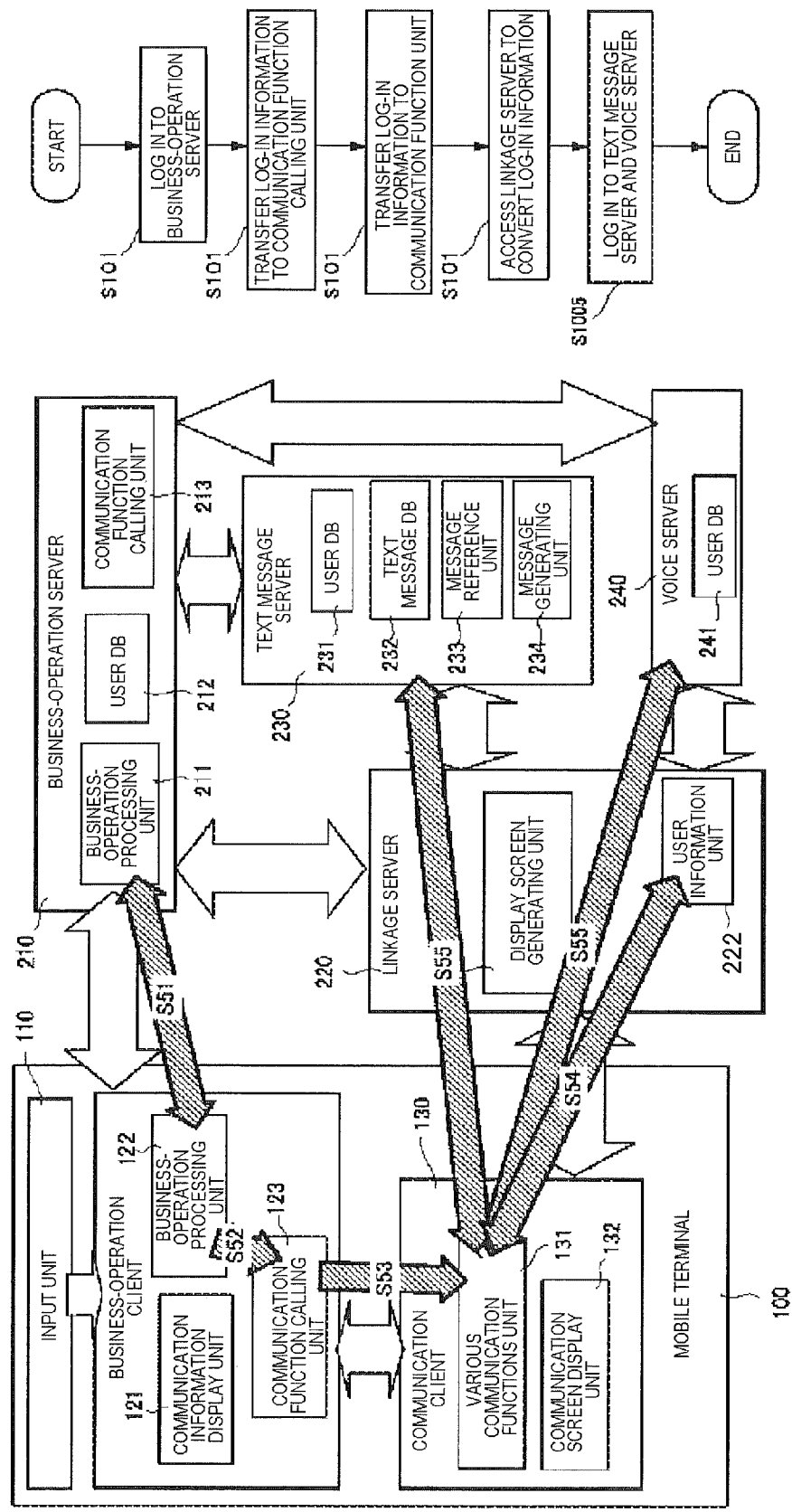
FIG. 5 is a diagram illustrating a flow related to log-in processes in the information processing system as the second exemplary embodiment according to the present invention.

FIG. 5 is a diagram illustrating a process flow at the time of logging in to the information processing system 2 according to this exemplary embodiment. At the time of log-in, a user first activates the business-operation client 120 of the mobile terminal 100, and inputs a user ID and a password. These pieces of information are transferred from the business-operation processing unit 122 to the business-operation processing unit 211 in the business-operation server 210. The business-operation processing unit 211 refers to the user database 212 to perform authentication of the user on the basis of the information received from the mobile terminal 100. If the user is confirmed, as a result of the authentication, to be a user who has been already registered, the business-operation processing unit 211 notifies the business-operation processing unit 122 to that effect (S51).

The business-operation processing unit 122 then requests the communication function calling unit 123 to log in to other server (S52). The communication function calling unit 123 informs the various communication functions unit 131 in the communication client 130 that it should log in to the text message server 230 and the voice server 240. The various communication functions unit 131 has already had addresses of the linkage server 220, the text message server 230, and the voice server 240, and first accesses the linkage server 220 to perform conversion from the user ID for a business-operation server. More specifically, using a table 600 (FIG. 6) stored in the linkage server 220, the user. ID for a business-operation server is converted into a user ID for a text message server and a user ID for a voice server (S54). The various communication functions unit 131 uses the thus obtained user IDs to log in to the text message server 230 and the voice server 240 (S55).

The table 600 shown in FIG. 6 is updated when a user who uses the business-operation server 210 is newly registered. In other words, it is desirable that user IDs for the text message server 230 and the voice server 240 are simultaneously registered when the user is newly registered for the business-operation server 210. Further, as shown in the table 600, when the registered user uses the mobile terminal 100, it is desirable to add, to the table 600, information identifying the mobile terminal 100. Although mobile terminal information is indicated as an IP address in FIG. 6, the mobile terminal information is not limited to this in the present invention, and it may be possible to indicate the mobile terminal information as special identification information that identifies the terminal. Further, for a user who has logged in to the business-operation server 210 using a communication terminal different from the mobile terminal 100, identification information of the communication terminal may be registered. It should be noted that, in FIG. 6, a character string formed by numbers and alphabet letters is used for the user ID. However, in the present invention, the user ID is not limited to this, and it may be possible to use a name of the user as the user ID. In particular, although SIP-URI is registered as an example of the user ID for the voice server, it may be possible to use a character string formed only by numbers such as a telephone number for the user ID for the voice server. Further, personal information of the user such as a name, telephone number, and physical address may be separately registered in association with the user ID.

[Process Flow for Starting Call and First Application Example]

Figure 7:
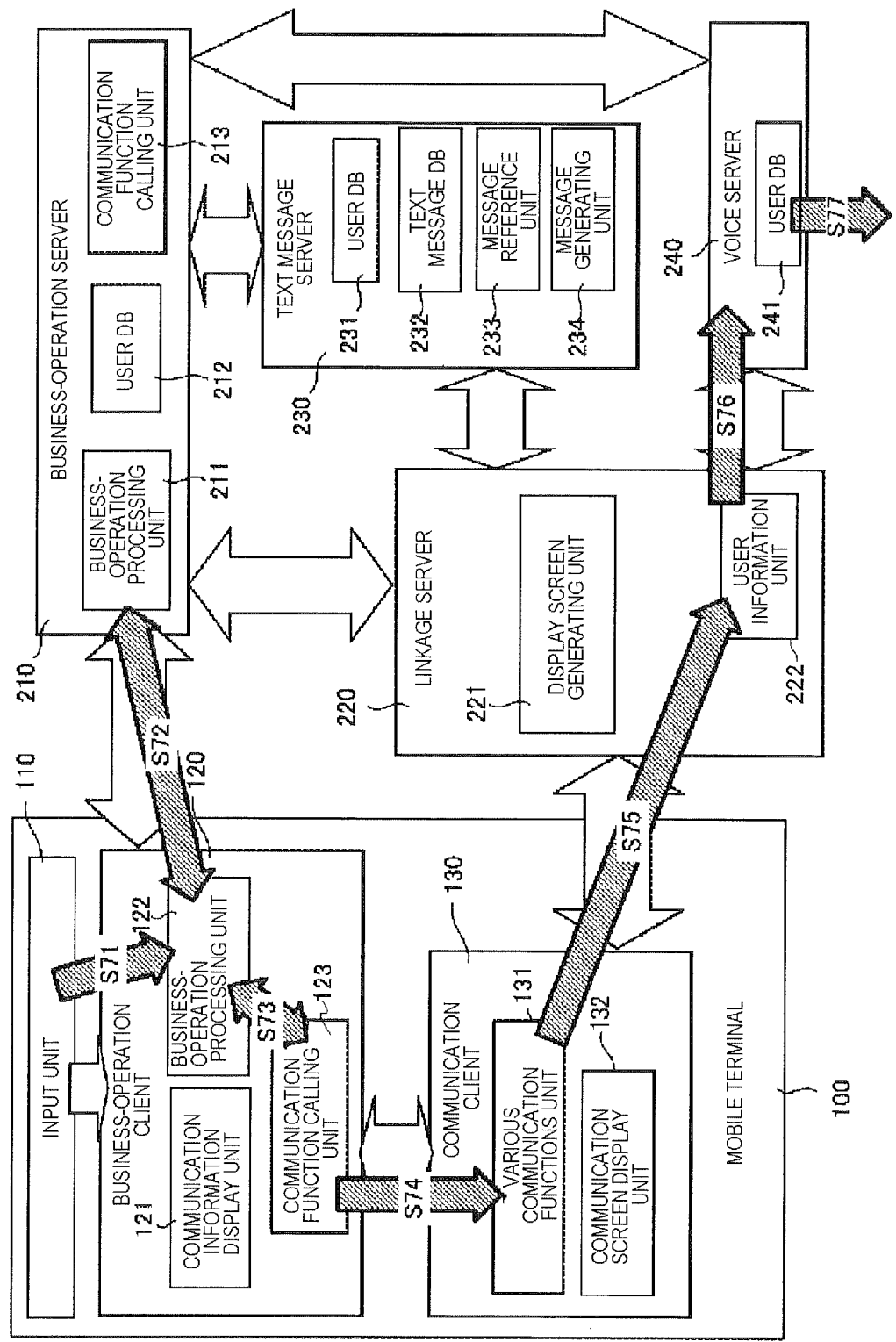
FIG. 7 is a diagram illustrating a process flow at the time of starting a call in the information processing system as the second exemplary embodiment according to the present invention.
Figure 9:
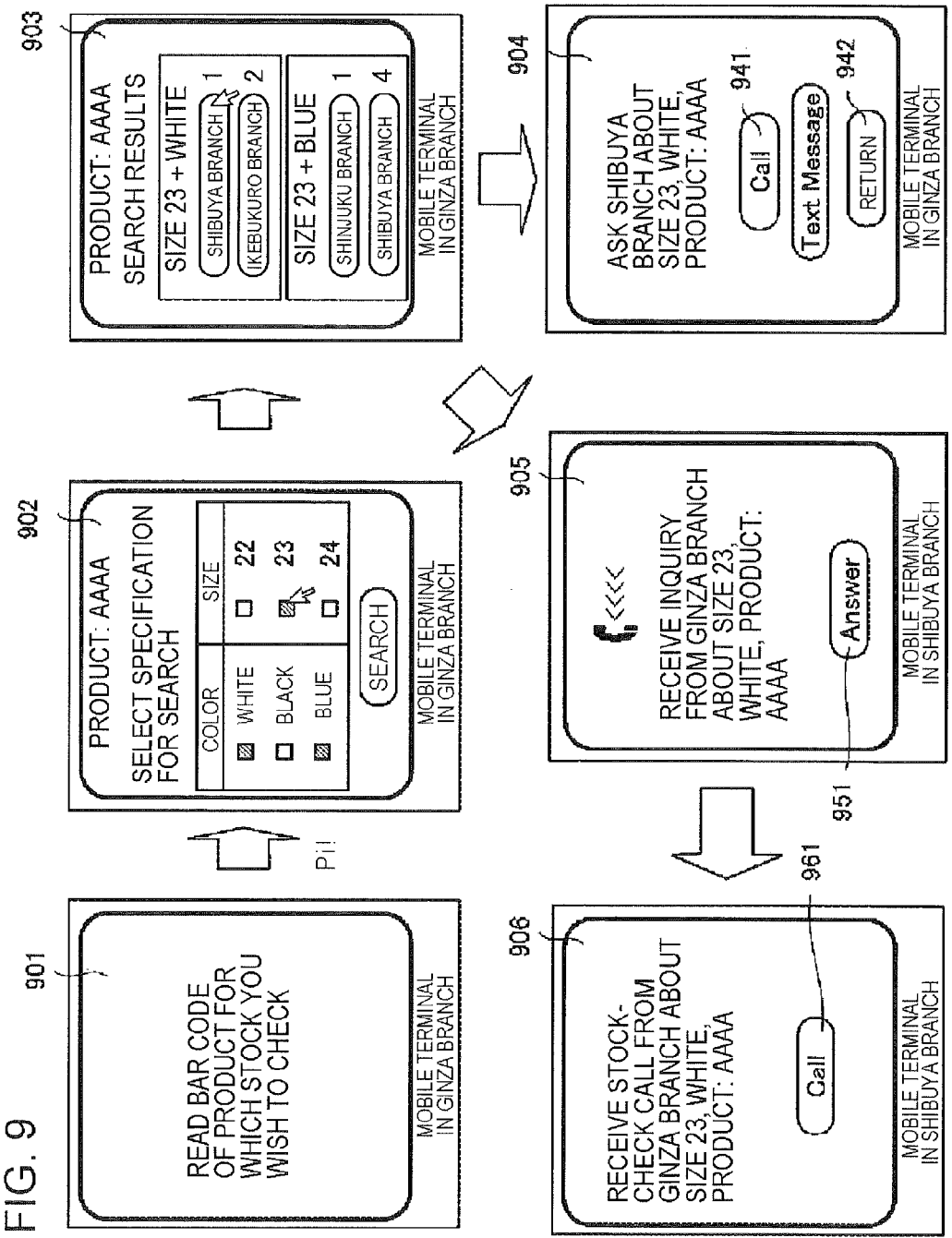
FIG. 9 is a diagram illustrating a screen transition example of a first application example according to the present invention.

FIG. 7 is a diagram illustrating a process flow for starting a call in the information processing system 2 according to this exemplary embodiment. First, the mobile terminal 100 activates the business-operation client 120, performs the log-in process described using FIG. 5, and collects information from the outside through the input unit 110 (S71). For example, a stock-searching operation will be described as a first application example. A screen 901 illustrated in FIG. 9 is displayed. Then, a user uses the bar code reader 111 to read a bar code attached to a product of which the user wishes to check stock. The collected information (for example, product number) is transmitted from the business-operation client 120 to the business-operation processing unit 211 of the business-operation server 210 (S72). The business-operation processing unit 211 searches a database, which is not illustrated, on the basis of the received information to obtain business-operation information (for example, specifications of the product), and returns to the business-operation client 120. As a result, the display 107 of the mobile terminal 100 displays, for example, a screen 902 illustrated in FIG. 9. Then, specifications of the product for which the user wishes to search are checked on this screen, and a "Search" button is depressed. The business-operation server 210 receives this information, and refers to a database, which is not illustrated, to perform a specific stock-searching operation. In other words, the business-operation server 210 searches the stock database that indicates what kind of products are available in which shop to obtain information on how much stock of product having the desired specifications is available in which shop. The results are transmitted again to the mobile terminal 100, and the display 107 of the mobile terminal 100 displays, for example, a screen 903 illustrated in FIG. 9.

In the case where the business-operation information obtained by the business-operation server 210 is associated with a contact destination for telephone call, the business-operation server 210 transmits characters or images indicating the contact destination together with the business-operation information to the business-operation processing unit 122. In the example illustrated in FIG. 9, the "Shibuya branch," "Ikebukuro branch," "Shinjuku branch," and "Shibuya branch" buttons in the screen 903 represent the contact destinations, and these branch names are transmitted to the mobile terminal 100 as available contact destinations. Contact destination information such as telephone numbers of branches may be transmitted to the mobile terminal 100 in a manner that the information is associated with each of the buttons. However, in this exemplary embodiment, such contact destination information is not transmitted, and only information for identifying the buttons (for example, a button 1 corresponds to a Shibuya branch, and a button 2 corresponds to an Ikebukuro branch) is transmitted. As the specific contact destination information such as a telephone number is not transmitted to the mobile terminal 100 as described above, problems such as leakage of information can be prevented.

In FIG. 7, when an operation serving as a trigger for inquiry through telephone call is received through the display screen concerning the business-operation information such as the screen 903, the business-operation processing unit 122 notifies the communication function calling unit 123 to that effect (S73). Then, the communication function calling unit 123 calls the various communication functions unit 131 of the communication client 130 (S74). With reference to the example illustrated in FIG. 9, if the "Shibuya branch" button is selected, a request to start a telephone call to "Shibuya branch" is transferred to the various communication functions unit 131. At the same time, the business-operation information (product information) such as "size 23, white product AAAA" is transmitted from the business-operation processing unit 122 through the communication function calling unit 123 to the various communication functions unit 131.

The various communication functions unit 131 transmits the request to start the telephone call with a call destination being assigned (and, if necessary, the business-operation information concerning the purpose of the telephone call), and information for identifying the mobile terminal 100 itself (for example, user ID for the business-operation server) to the linkage server 220 (S75).

The linkage server 220 uses the received telephone call destination (for example, Shibuya branch) to refer to the user information unit 222, thereby obtaining the user ID for the voice server associated with the call destination. The linkage server 220 obtains the SIP address as shown, for example, in the table 600 in FIG. 6. Similarly, the linkage server 220 uses information for identifying the mobile terminal 100 itself to obtain the user ID for the voice server (for example, SIP address) of the mobile terminal 100.

The thus obtained two user IDs for the voice server (and, if necessary, the business-operation information) are transferred to the voice server 240 (S76). The voice server 240 confirms, using the user database 241, that these users ID for the voice server correspond to the user IDs of the user who has logged in, and then, makes a call to the destination to start the telephone call conversation.

In the example illustrated in FIG. 9, the mobile terminal 100 on the call originator side displays the screen 904 to ask the user whether to make a call to inquire about the business-operation information, or to generate a text message. If the "Call" button 941 is selected, the telephone call starts. If the "Return" button 942 is selected, the process in the communication client 130 is stopped, and the flow returns to the process made between the business-operation client 120 and the business-operation server 210 (S72).

On the other hand, when receiving an incoming call from the mobile terminal 100 in the Ginza branch, the mobile terminal 100 in the Shibuya branch displays a received message describing inquiry details as illustrated in the screen 905. If the "Answer" button 951 is selected, a response is made to start a voice communication. If the response is not made, details of the incoming call are displayed as illustrated in the screen 906. If the "Call" button 961 is selected, a call to the Ginza branch, which is the call originator, is started to be made.

As described above, the user of the mobile terminal 100 can start to make the call to the inquiry destination for the business operation in an extremely easy manner. At this time, searching for the telephone number is not necessary, and it is only necessary for the user to designate the contact destination displayed as the business-operation information. Further, in this exemplary embodiment, the linkage server 220 manages all the personal information. Thus, the important information such as the telephone number and the SIP address is not transmitted to the mobile terminal 100, so that the risk of leakage of information can be eliminated.

As described above, the business-operation client 120 displays the business-operation information and the information serving as the trigger for starting a call on the display 107 of the mobile terminal 100, so that the mobile terminal can receive operations from the user. With this configuration, the business-operation system and the communication system are linked in an appropriate manner, which makes it possible to significantly reduce the operational burden that the user has to bear.

[Process Flow for Transmitting Text Message and First Application Example]

Figure 8:
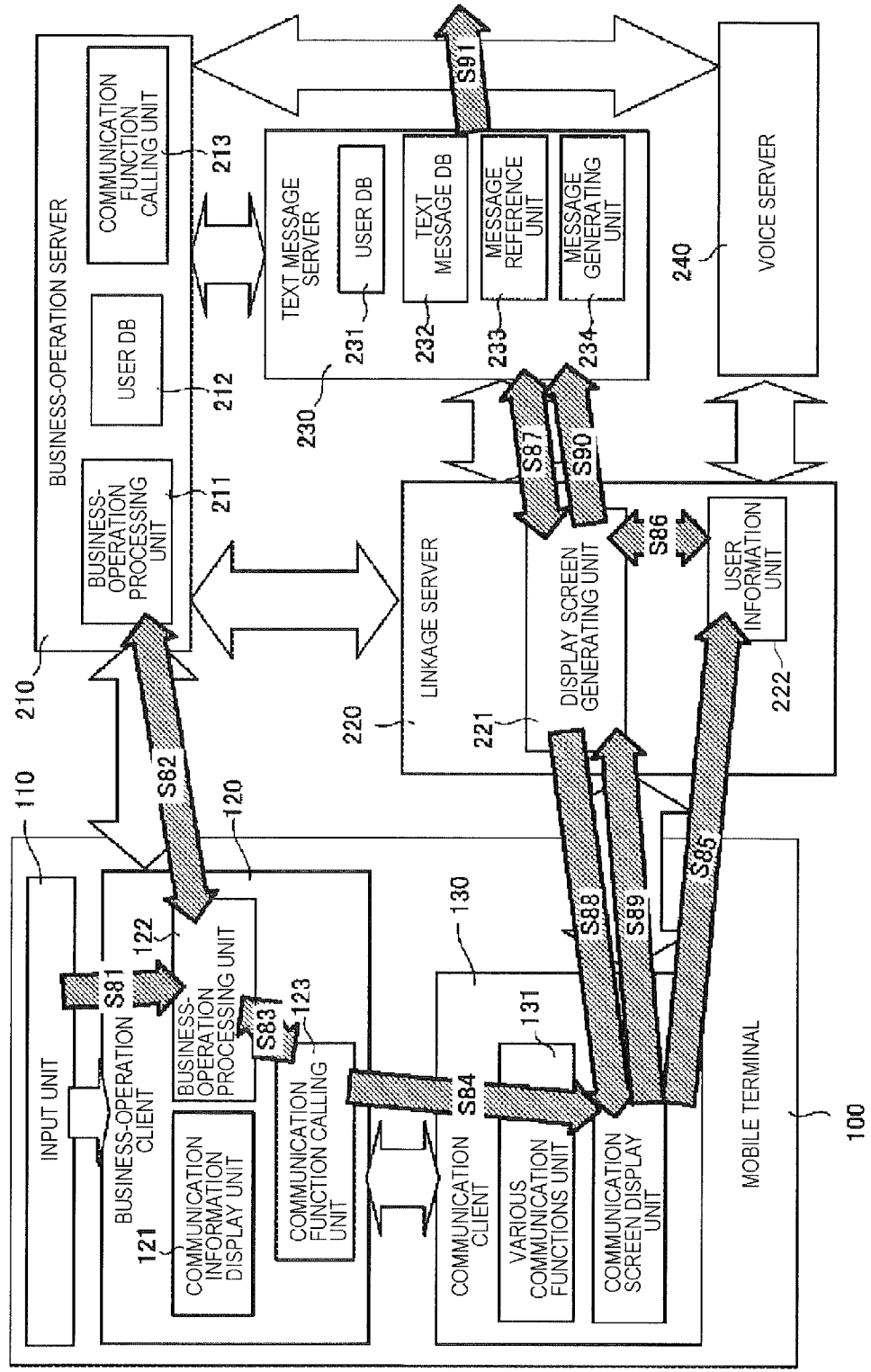
FIG. 8 is a diagram illustrating a process flow at the time of transmitting a message in the information processing system as the second exemplary embodiment according to the present invention.

Next, with reference to FIG. 8, a process flow for transmitting text messages will be described. First, the mobile terminal 100 activates the business-operation client 120, performs the log-in process described using FIG. 5, and collects information from the outside using the input unit 110 (S81). For example, a stock searching will be described. In a similar manner to the case of starting the call, the screen 901 illustrated in FIG. 9 is displayed. Then, the user uses the bar code reader 111 to read the bar code attached to a product of which the user wishes to check stock. The collected information (for example, product number) is transmitted from the business-operation client 120 to the business-operation processing unit 211 of the business-operation server 210 (S82). The business-operation processing unit 211 searches a database, which is not illustrated, on the basis of the received information to obtain business-operation information (for example, specifications of the product), and sends back the obtained business-operation information to the business-operation client 120.

As a result, the display 107 of the mobile terminal 100 displays, for example, the screen 902 illustrated in FIG. 9. Then, specifications of the product for which the user wishes to search are selected on this screen, and a "Search" button is depressed. The business-operation server 210 receives the information, and refers to a database, which is not illustrated, to perform a specific stock searching operation. The results are transmitted again to the mobile terminal 100, and the display 107 of the mobile terminal 100 displays, for example, the screen 903 as illustrated in FIG. 9.

When details of the inquiry and the inquiry destination are selected, and transmission of a text message is selected, the business-operation processing unit 122 notifies the communication function calling unit 123 to that effect. The communication function calling unit 123 calls up the various communication functions unit 131 of the communication client 130.

In the example illustrated in FIG. 9, if the "Shibuya branch" button is selected, a request to transmit a text message to the "Shibuya branch" is transferred to the various communication functions unit 131. At the same time, the business-operation information (product information) such as "size 23, white product AAAA" is transmitted from the business-operation processing unit 122 through the communication function calling unit 123 to the various communication functions unit 131.

The various communication functions unit 131 transmits the request to transmit a message whose destination is designated, the business-operation information, and information for identifying the mobile terminal 100 itself (for example, the user ID for the business-operation server) to the linkage server 220 (S85).

Figure 18:
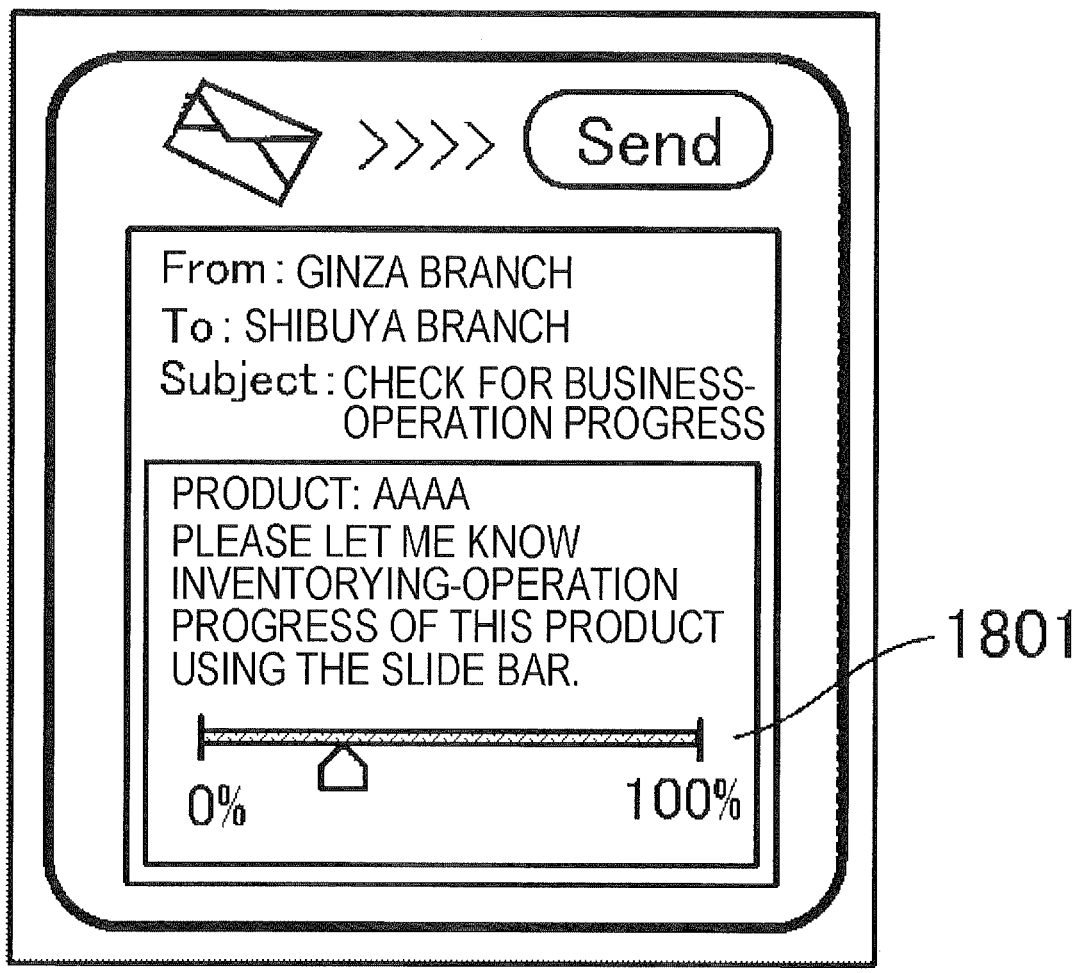
FIG. 18 is a diagram illustrating an example of a display screen of the information processing system as the second exemplary embodiment according to the present invention.

The linkage server 220 receives the request to transmit the message whose destination (for example, Shibuya branch) is assigned, refers to the user information unit 222, and obtains the user ID for the message server associated with the transmission destination. Similarly, the linkage server 220 uses the information for identifying the mobile terminal 100 itself to obtain the user ID for the message server of the mobile terminal 100. The thus obtained information is transferred to the display screen generating unit 221. The display screen generating unit 221 uses the received information to read a preset text message from the text message server 230 (S87), combines it with the business-operation information, generates a message, and returns the generated message data to the communication screen display unit 132 (S88). The text message server 230 is provided in advance with a table 1401 as illustrated in FIG. 11. The business-operation server 210, the linkage server 220 or the text message server 230 determines which preset text message is used, on the basis of the business-operation information, the source user information, and the location information of the information terminal serving as the transmission source or transmission destination. More specifically, the preset text message is selected using at least one of inquiry-source terminal ID, inquiry-source terminal location, inquiry details ID, inquiry-destination terminal ID, inquiry-destination terminal location, and inquired product information included in the business-operation information. A status flag is attached to the preset text message, and message properties such as "urgent," "reply is necessary," and "no replay is necessary" are associated with the preset text message. By transmitting the preset text message having these properties associated therewith to the destination, the destination can easily determine what kind of property this message has. The preset text message is not limited to that shown in FIG. 11, and it may be possible that the preset text message include a check box for "YES" and "NO" for asking the presence or absence of the stock or a slide bar 1801 for asking progress of operations as illustrated in FIG. 18. These preset text messages can be easily transmitted, and also enable the message-receiving terminal side to easily generate a reply message.

Next, a detailed description will be made with reference to FIG. 10. Once a transmission destination is designated on a screen such as the screen 903 displaying stock searching results, the mobile terminal 100 displays, for example, a screen 1001, which makes it possible to select a text message button 1011. Then, when the text message button 1011 is selected, a message sentence as illustrated in a screen 1002 is generated through the linkage server 220 and the text message server 230, and is displayed on the mobile terminal 100. The transmission source and the transmission destination are designated through the mobile terminal 100, and the "Subject, Product name, Specification (size and color in this example)" are obtained from the business-operation information. Further, the expression "Is there any stock? Yes, No. In the case where the stock is little, the number of products available:" in the main body is prepared in advance in the text message server 230. After this, it is possible for the user to transmit the message for checking the stock, only by selecting the transmission button 1021 (S89, S90, S91). After the transmission, the display returns to the screen 1003 showing the stock searching results before the generation of the text message. As described above, the business-operation server 210 and the text message server 230 work while being associated with each other, whereby it is possible to significantly reduce the work load required for transmitting the message.

On the other hand, the terminal on the message receiving side can receive the message while operating the business-operation system. For example, in the example illustrated in FIG. 10, the linkage server 220 and the communication information display unit 121 perform processes in a manner such that a message reception icon 1041 is displayed on a part of the business-operation screen as shown in a screen 1004. The display mode of the message reception icon 1041 can be change according to the properties of the message (whether urgent or not, whether reply is necessary or not). For example, the message reception icon 1041 is normally displayed in black, and when an urgent message is received, the message reception icon 1041 may be displayed in red. When settling the business operation and checking messages, the user clicks the message reception icon 1041.

Figure 15:
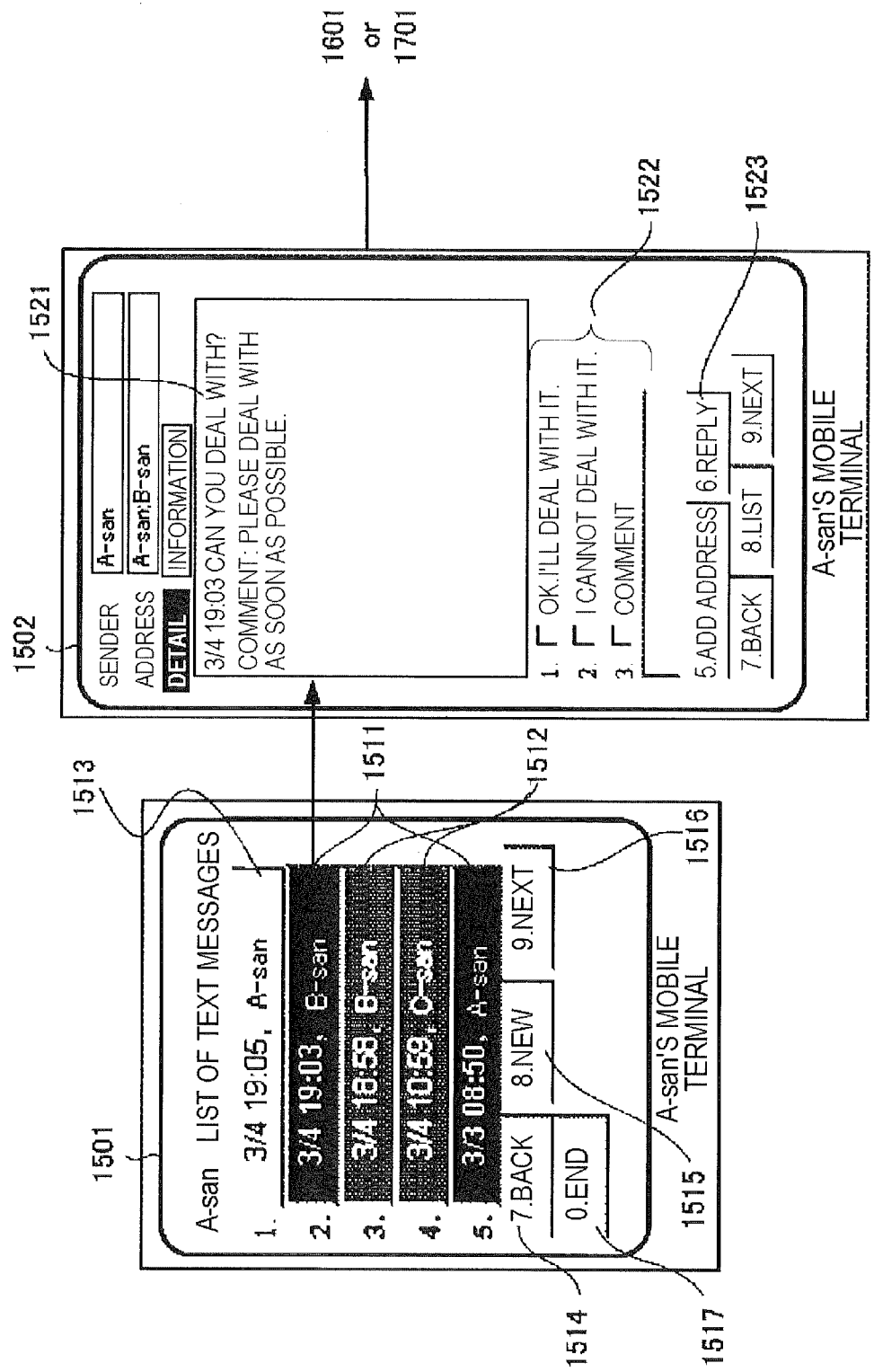
FIG. 15 is a diagram illustrating an example of a display screen of the information processing system as the second exemplary embodiment according to the present invention.

FIG. 15 illustrates another example of the screen displayed on the communication screen display unit 132. A screen 1501 showing a list of text messages illustrated in FIG. 15 is called through operations on the screen displayed by the business-operation processing unit 122. The mobile terminal 100 can display the screen 1501 showing a list of text messages while running the business operations. Thus, the user can immediately return to the business operation, by closing the screen 1501 showing a list of text messages. On the screen 1501 showing a list of text messages, the list of the received messages is displayed with a received date, a sender name as well as plural buttons. In this specification, the display mode of the buttons is changed according to the properties of the message. More specifically, in the screen 1501 showing a list of text messages illustrated in FIG. 15, an important message (which requires action) is displayed with a black button 1511, a message sent for reference purpose (for an informational purpose only) is displayed with a gray button 1512, and other messages (which has been dealt with) are displayed with a white button 1513. In this screen 1501 showing a list of text messages, there are prepared a "Back" button 1514 and a "Next" button 1516 for changing displays between plural lists, and a "New" button 1515 for creating a new message. Further, an "End" button 1517 for ending the message-creating transmission process is also prepared.

When the user clicks the message button on the screen 1501 showing a list of text messages to select any one of the received message, a reply message 1502 corresponding to the selected received message is opened. The reply message 1502 is a message for replying to B-san, and hence, "B-san" is contained in the destination address. A message column 1521 describes details about what B-san wishes to ask A-san. In this respect, a preset message column 1522 for reply is prepared at the lower portion of the message column 1521. More specifically, there are three check boxes including "OK. I'll deal with it," "I cannot deal with it," and "Comment." Basically, A-san can finish replying by checking any one of upper two check boxes, and clicking a reply button 1523.

Figure 16:
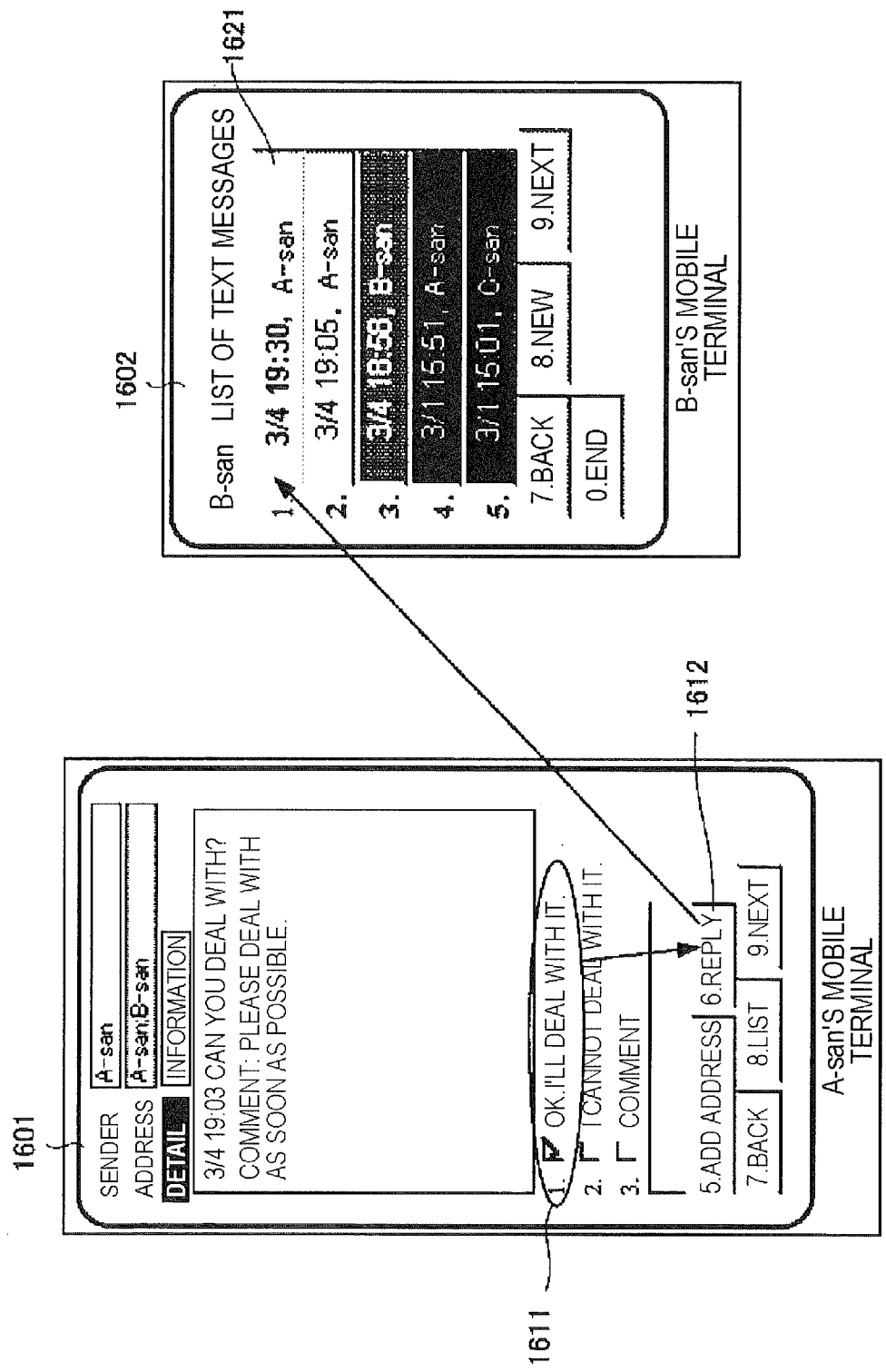
FIG. 16 is a diagram illustrating an example of a display screen of the information processing system as the second exemplary embodiment according to the present invention.

FIG. 16 illustrates a screen 1601 displayed when a check box 1611 for "OK. I'll deal with it." is checked. By selecting a reply button 1612 in this state, it is possible to finish replying. As described above, A-san can reply to the inquiry from B-san in an extremely easy manner only by checking the check box. On a screen 1602 showing a list of text messages displayed on the mobile terminal of B-san who receives this reply, a button 1621 including message reception date and time, and the sender is newly displayed. In this example, A-san made a positive reply of "I'll deal with it." in response to the inquiry of "Can you deal with?" from B-san to A-san. In this case, the reply message itself is not important and urgent, and hence, the button 1621 is displayed in white.

Figure 17:
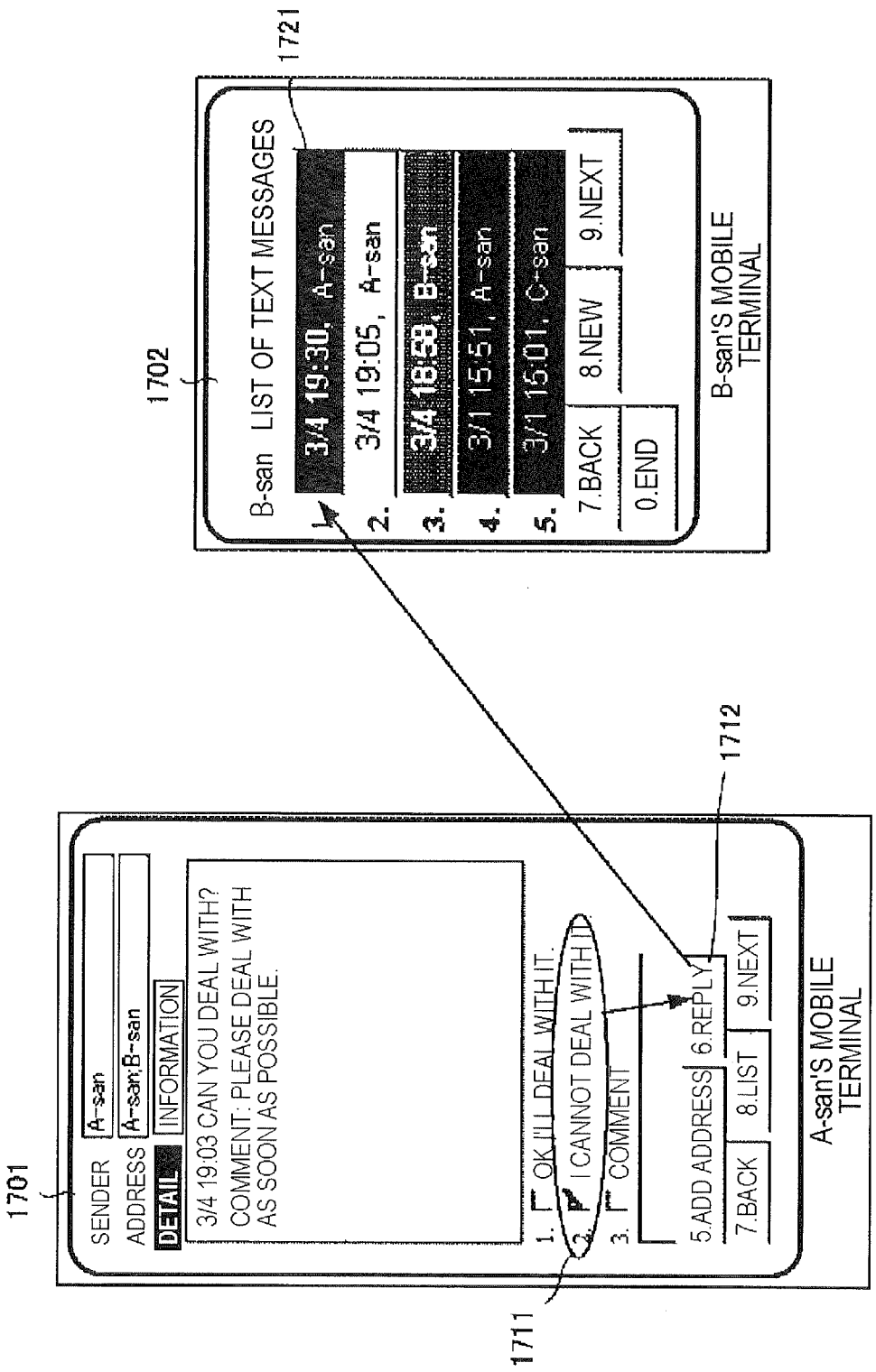
FIG. 17 is a diagram illustrating an example of a display screen of the information processing system as the second exemplary embodiment according to the present invention.

On the other hand, FIG. 17 illustrates the screen 1601 displayed when a check box 1711 for "I cannot deal with it" is checked. By selecting a reply button 1712 in this state, it is possible to finish replying. On a screen 1702 showing a list of text messages displayed on the mobile terminal of B-san who receives this reply, a button 1721 including message reception date and time and sender (A-san) is newly displayed. In this example, A-san made a negative reply of "I cannot deal with it." in response to the inquiry of "Can you deal with?" from B-san to A-san. In this case, the reply message is important, and hence, the button 1721 is displayed in black.

As described above, the preset text message includes the check box to be checked by the message destination. The display screen generating unit 221 and the communication screen display unit 132, which serve as the message display unit, change display modes of the received preset text message according to which check box in the replied preset text message is checked. The display mode can be changed by changing colors in the list, which has been described with reference to FIG. 16 and FIG. 17, or by attaching specific marks such as "!" and "?" to the message to show the property of the message.

When a message-opening operation is performed in the mobile terminal 100, the received message is displayed. In this exemplary embodiment, the received preset text message can be used as a message for reply without any modification being applied. Thus, it is possible to significantly reduce the amount of reply operation, by inputting necessary matters such as "YES," "NO" and numeral, and then replying.

Figure 10:
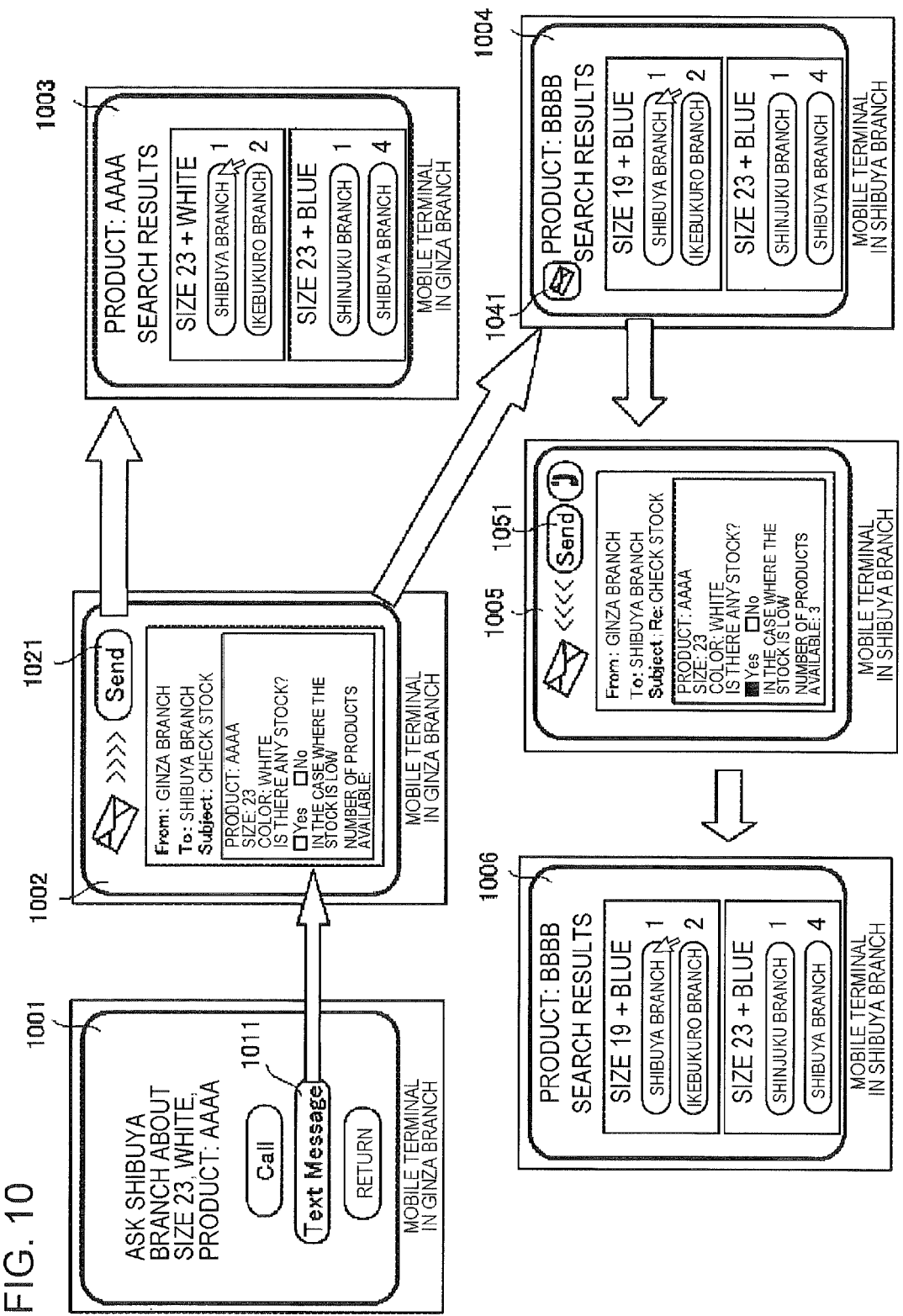
FIG. 10 is a diagram illustrating a screen transition example of the first application example according to the present invention.

For example, in FIG. 10, the screen 1005 is displayed by clicking the message reception icon 1041 on the screen 1004. At this time, a reply message including the stock-check target and the transmission destination, which have been already designated, is displayed. In this example, it is possible to reply only by inputting the availability (Yes, No) of the stock, and if necessary, the number of products available (3 in this example). After the reply, the display returns to the original business operation screen 1005 (without the message reception icon 1041).

It should be noted that, in this exemplary embodiment, the business-operation information is transmitted through the mobile terminal 100 to the text message server 230. However, the present invention is not limited to this. It may be possible to employ a configuration in which the business-operation server 210 transmits, to the text message server 230, the business-operation information that specifies the mobile terminal 100. In this case, the text message server 230 selects a preset text message on the basis of the business-operation information transmitted from the business-operation server 210, and transmits it to the display screen generating unit 221 of the linkage server 220.

As described above, in this exemplary embodiment, the business-operation client has a function serving as a trigger for starting access to the voice server or text message server. More specifically, with a GUI displayed on the mobile terminal by the business-operation client, the user can communicate with a necessary contact without knowing or designating the specific contact during business operations, by displaying a "Call" button or "Create message" button.

[Second Application Example]

Figure 12:
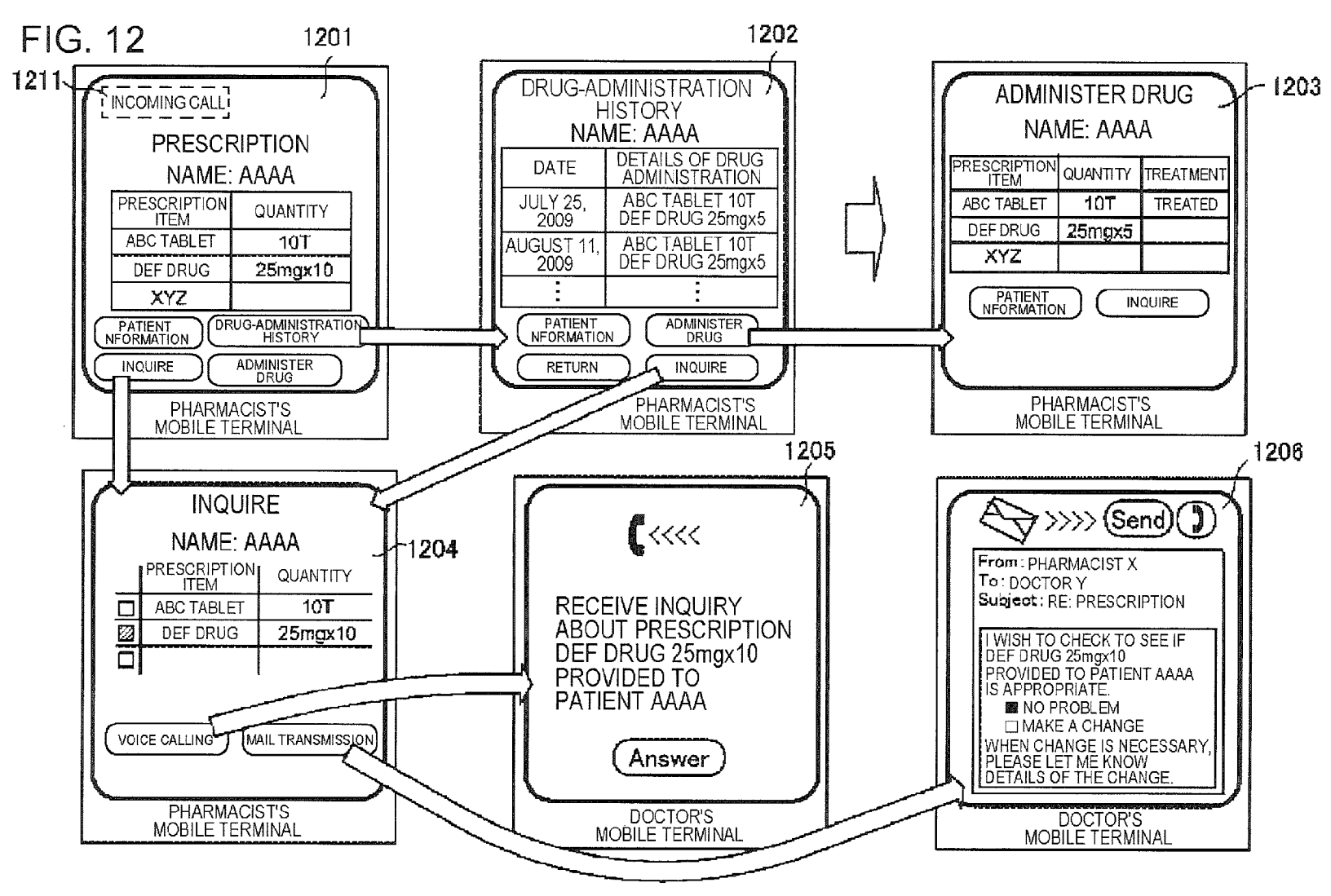

With reference to FIG. 12, a description will be made of a specific example in which the information processing system according to this exemplary embodiment is applied to a medical field.

First, when a pharmacist checks prescription through pharmacist's mobile terminal, a screen 1201 is displayed on the pharmacist's mobile terminal. In this example, when a drug-administration history button is selected, the display moves to a screen 1202 to display details of past drug-administration. In the case where an "Administer drug" button is selected on the screen 1201 or screen 1202, a screen 1203 is displayed, and a process moves to drug administration. More specifically, for each drug specified in the prescription, a bar code attached to the drug is read, and then, the information that the drug is provided to a patient (process is completed) is inputted.

If there is any doubt about the prescribed drug at the time of administration of the drug, an "Inquire" button is selected, and the display moves to a screen 1204. By designating the drug that the pharmacist wishes to check and selecting the voice calling, a telephone call is made, and a screen 1205 is displayed on a mobile terminal that a doctor in charge has. At the same time, the business-operation information is also transmitted, which enables the doctor to immediately know what kind of inquiry is coming. When available to respond to the inquiry, the doctor responds to the inquiry to transmit appropriate advice to the pharmacist. In this specific example, the doctor can explain the reason that the number of DEF drug increases from 5 pieces to 10 pieces.

On the other hand, when a mail is transmitted, a screen 1206 is displayed on the mobile terminal of the doctor. At this time, the linkage server 220 reads out the transmission source and the transmission destination on the basis of the business-operation information. Further, on the basis of information obtained from the business-operation client 120 or business-operation server 210, the linkage server 220 modifies a preset text message read out from the text message server 230 to generate a main body of the message. The main body of the message has a configuration in which it is possible to reply only by selecting items or inputting numerals. In this application example, by checking that the number of DEF drug increases from 5 pieces to 10 pieces, it is possible to reply with "No problem." Then, by receiving the reply from the doctor, the pharmacist can confidently administers the drug.

As described above, by applying this exemplary embodiment to the medical field, and checking the administration of drug or examination results, it is possible to prevent medical malpractices and accelerate treatments. For example, by scanning both the patient and drug to be administered, it is possible to prevent careless medical mistakes. By inputting the examination results and drug administration record of the patient through a mobile terminal, and uploading them to a server, it is possible to transmit information and share the information in the medical field in real time. Further, by adding a location-specifying function to the mobile terminal, it is possible to check the location of medical staff while staying at a nurses station, thereby efficiently arranging and calling the staff. Yet further, it is possible to make the most of data to improve communication between medical staff. As described above, by holding a discussion among the medical staff on the basis of the data (examination results and drug administration results) scanned with the mobile terminal, it is possible to reduce the time required for dealing with and reduce the number of medical mistakes. Further, it is possible to simultaneously broadcast, to all the medical staff, matters that all the medical staff has to know.

[Other Specific Application Examples]

[Store Operation]

By applying the information processing system according to this exemplary embodiment to a business-operation system for store operations, and further modifying it, this business-operation system can be used for the following applications.
(1) Acquire the number of products available, location of the stock available or other information through a mobile terminal from a server.
(2) Acquire operational instruction information or other information from a server.
(3) Transmit order-processing information to a server.
(4) Acquire order status information from a server.
(5) Always notify a server of current location of the mobile terminal (employee).

Further, a communication system having an association with the business-operation system can be used for the following applications.
(1) Simultaneously broadcast today's reminder or other message through text message.
(2) Read merchandise information serving as a target of merchandise searching from a bar code, and transmit the merchandise information through text message.
(3) Check available merchandise with a person in charge in other shop using a telephone in the case where the stock is available in this shop. At this time, a product number is acquired from a bar code to let the person in charge know the merchandise information, and is transmitted through text message. Reserve the merchandise in stock and check delivery time using a telephone or through access to a system using a mobile terminal.
(4) Get in contact through voice to ask an unclear matter that cannot be understood only through the system or to notify occurrence of accident at a shop.
(5) A temporary worker having less knowledge about merchandise checks with a skilled person in an office through telephone to make certain of display arrangement or availability of merchandise. Transmit information on the merchandise or related URL through text to a mobile terminal that the temporary worker has.
(6) Simultaneously broadcast information on lost child or related URL information through text message.
(7) Notify a manager through telephone or text when finding a child who looks like the lost child. At the same time, notify the manager of the current location. Check using telephone or camera that the child is the target child.
(8) Ask for help from staff working at a currently non-crowded section through telephone or text message to operate at a section where a large crowd is expected to show up because of a bargain sale. Reply with OK/NO through telephone or text message.

In the above-described situations, it is possible to provide customers with appropriate and quick services, thereby improving the customer satisfaction, and to achieve cooperation in business operations such as stock checking and ordering, thereby improving operational efficiency. Further, by supporting employees having less ability, it is possible to equivalently improve the quality of all the employees, thereby improving the customer satisfaction.

[Warehouse Operation]

By applying the information processing system according to this exemplary embodiment to a business-operation system for warehouse operations, and further modifying it, this business-operation system can be used for the following applications.
(1) Check incoming products and invoice using a scanner function to perform an inspection operation.
(2) Check stock of other warehouse on site in real time.
(3) Read bar codes of outgoing products, and acquire information on the outgoing products, thereby managing shipping of products.
(4) Attach bar codes to each storage section in the warehouse, and read the bar code, thereby managing incoming products and storage sections so as to be associated with each other.

Further, a communication system having an association with the business-operation system can be used for the following applications.
(1) Immediately get in contact with the manager through voice if the number of incoming products is found to be insufficient or damage in the incoming products during an incoming operation or inspection. Add product information read through the scanner to text message.
(2) Give field staff voice-instructions.
(3) Order the insufficient stock through voice, and transmit product information in an electronic data form.

In the above-described situations, it is possible to make storage management, inventory management, and product collection much easier, and reduce the ordering error.

[Fitness Center]

By applying the information processing system according to this exemplary embodiment to a business-operation system for fitness centers, and further modifying it, this business-operation system can be used for the following applications.
(1) Instructors carry a mobile terminal, and users wear a wristband having a bar code attached thereto. The mobile terminal reads the bar code, and acquires the degree of skill or health conditions from a server. Give appropriate advice on how to use equipment or the degree of load.
(2) Consult the server about a facility reservation or confirmation of reservation, and provide a user with usage information.

Further, a communication system having an association with the business-operation system can be used for the following application.
(1) An unskilled instructor makes a call to a skilled instructor to seek appropriate advice.

Further, it may be possible to employ a configuration in which a mobile terminal is connected to equipment to enable a user to use the mobile terminal. In the above-described situation, fitness centers can provide their users with detailed services.

[Third Exemplary Embodiment]

Figure 13:
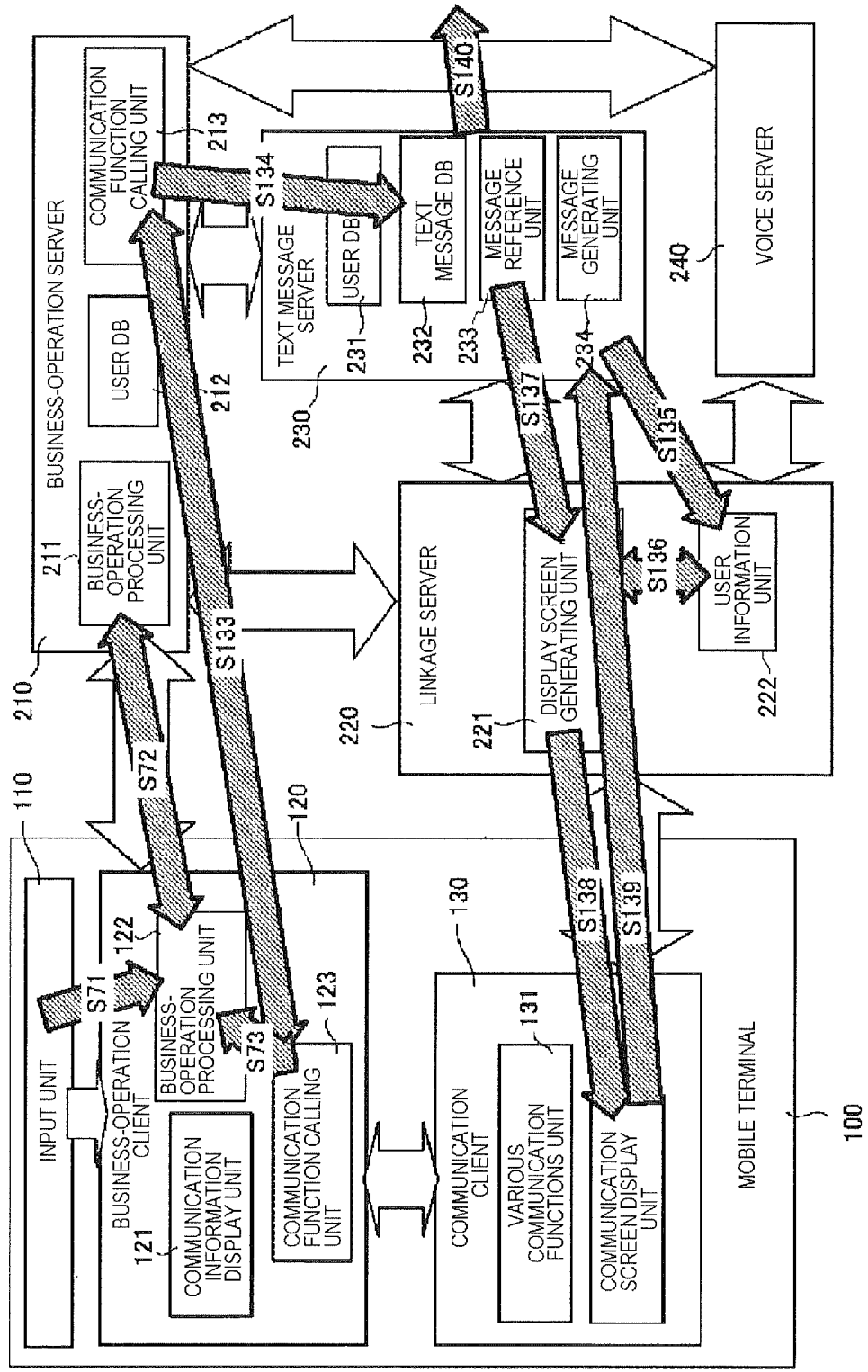
FIG. 13 is a diagram illustrating a flow of transmitting messages in an information processing system as a third exemplary embodiment according to the present invention.

An information processing system as a third exemplary embodiment of the present invention will be described with reference to FIG. 13. Since the configuration of the information processing system itself is almost the same as that of the second exemplary embodiment, the same constitutional elements are denoted by the same reference characters, and detailed description thereof will not be repeated.

Unlike the second exemplary embodiment, in this exemplary embodiment, the communication function calling unit 123 transmits a request to start communication to the communication function calling unit 213 of the business-operation server 210. A detailed process flow will be described below.

First, when receiving an operation serving as a trigger for making an inquiry through text message on a business-operation information display screen such as the screen 903 and the screen 904 illustrated in FIG. 9, the business-operation processing unit 122 notifies the communication function calling unit 123 to that effect (S73). Then, the communication function calling unit 123 transmits a request to start communication to the communication function calling unit 213 of the business-operation server 210, rather than the communication client 130 (S133).

Upon receiving the request, the communication function calling unit 213 transmits the business-operation information, the source information, and the destination information (for example, information such as Ginza branch and Shibuya branch) to the text message server 230 (S134). The text message server 230 transmits these pieces of information to the linkage server 220, and refers to the table 600 in the user information unit 222 shown in FIG. 6, and obtains the user IDs for the text message server for the source and the destination (S135). These user IDs are transferred to the display screen generating unit 221 (S136). At the same time, the text message server 230 makes a request to generate a display screen for the mobile terminal 100 to transmit the text message (S137).

The linkage server 220 selects an appropriate preset text message from among plural preset text messages included in the table 1401 prepared in the text message server 230 and illustrated in FIG. 11. More specifically, the preset text message is selected using at least one of an inquiry-source terminal ID, an inquiry-source terminal location, an inquiry details ID, an inquiry-destination terminal ID, an inquiry-destination terminal location, inquired product information, and other information included in the business-operation information. A status flag is attached to the preset text message, and message properties such as "urgent," "reply is necessary," and "no reply is necessary" are associated with the preset text message. By transmitting the preset text message having these properties to the destination, the destination can easily determine what kind of property this message has.

The display screen generating unit 221 combines the selected preset text message, and information on the transmission source and the transmission destination to generate a display screen displayed on a mail generation screen of the mobile terminal 100, and transmits data on the generated display screen to the mobile terminal 100 (S138). On the mobile terminal 100, the user checks the displayed message, adds information if necessary, and transmits a transmission instruction to the text message server 230. In response to the transmission request, the text message server 230 transmits a text message to a designated destination (S140).

Figure 14:
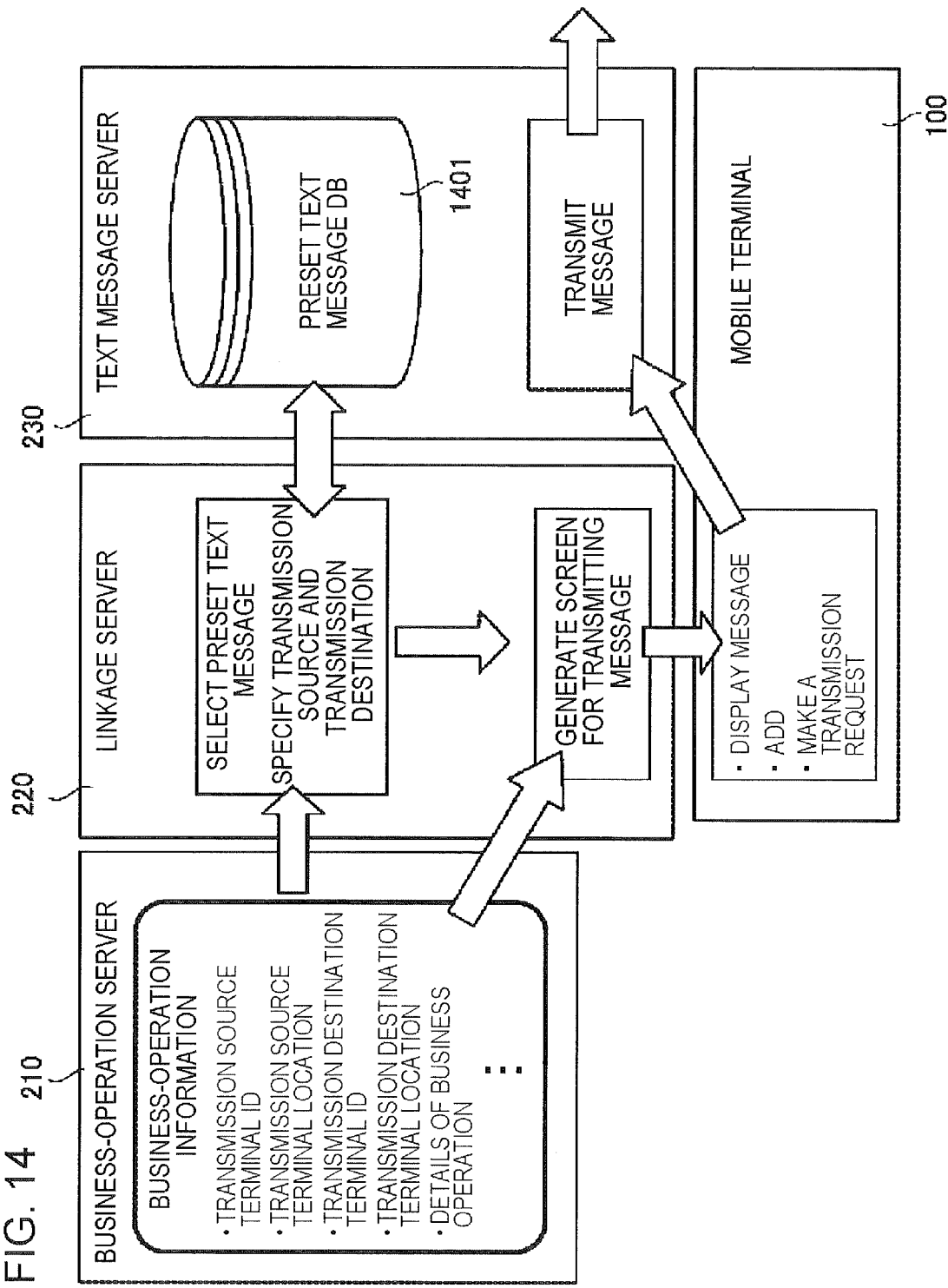
FIG. 14 is a schematic view illustrating a flow of transmitting messages in an information processing system as an exemplary embodiment according to the present invention.

FIG. 14 is a schematic diagram for explaining a flow of a message transmitting process. As illustrated in FIG. 14, the business-operation server 210 transmits, to the linkage server 220, at least one of a source terminal ID, a source terminal location, a destination terminal ID, a destination terminal location, details of business operation concerning the text message as the business-operation information. At this time, it may be possible to designate a group formed by plural destinations for simultaneous broadcasting as the business-operation information. Then, using such business-operation information, the linkage server 220 selects an appropriate text message from the preset text message database 1401. This selection process is not limited to be performed by the linkage server 220, and the business-operation server 210 or text message server 230 may perform the selection process. The linkage server 220 specifies addresses of the source and the destination for transmitting the text message, and using the selected preset text message, generates a screen for transmitting a message displayed on the mobile terminal 100.

The mobile terminal 100 displays the screen for transmitting the message generated by the linkage server 220, adds information if necessary, and makes a transmission request. The text message server 230 transmits the text message on the basis of the transmission request received from the mobile terminal 110.

As described above, according to this exemplary embodiment, only by making a request of "wish to transmit a text message concerning this business operation" using the mobile terminal, "designating the contact destination" and "selecting the preset text message" are performed on the servers' side. This makes it possible to significantly rapidly transmit the message. Further, the preset text message itself contains options for replying. This provides an effect that the terminal that receives the message can transmit a reply message in a significantly easy manner.

[Other Exemplary Embodiments]

These are detailed descriptions of the exemplary embodiments according to the present invention. However, the present invention includes systems and devices obtained by variously combining the features contained in each of the exemplary embodiments.

Further, the present invention may be applied to a system formed by plural devices or units, or may be applied to a single device. Yet further, the present invention may be used in an application in which an information processing program that carries out each of the functions of the exemplary embodiments described above is provided directly or remotely to a system or device. Thus, the present invention includes a program to be installed in a computer to enable the computer to carry out the functions of the present invention, a computer-readable storage medium (including a sustainable storage medium) that stores the program, and a WWW server that allows the program to be downloaded.

[Other Expressions of the Exemplary Embodiments]

All or part of the exemplary embodiments may be described as the following supplementary notes but is not limited to the following supplementary notes.

[Supplementary Note 1]

An information processing system including:

an acquiring unit that acquires business-operation information in response to a request from a mobile terminal;

a storage unit that stores plural preset text messages;

a selection unit that selects a preset text message corresponding to the business-operation information acquired by the acquiring unit from among the plural preset text messages;

a determining unit that determines a message destination corresponding to the business-operation information acquired by the acquiring unit; and a transmitting unit that transmits the preset text message selected by the selection unit to the message destination determined by the determining unit.

[Supplementary Note 2]

The information processing system according to Supplementary Note 1, further including:

a business-operation server including the acquiring unit;

a text message server including the storage unit; and a linkage server including the determining unit.

[Supplementary Note 3]

The information processing system according to Supplementary Note 2, in which the text message server further includes the selection unit.

[Supplementary Note 4]

The information processing system according to Supplementary Note 2, in which the business-operation server further includes the selection unit.

[Supplementary Note 5]

The information processing system according to Supplementary Note 2, in which the linkage server further includes the selection unit.

[Supplementary Note 6]

The information processing system according to any one of Supplementary Notes 1 to 5, in which the preset text message includes an option to be selected by the message destination.

[Supplementary Note 7]

The information processing system according to any one of Supplementary Notes 1 to 6, in which the preset text message includes a check box to be checked by the message destination.

[Supplementary Note 8]

The information processing system according to any one of Supplementary Notes 1 to 7, in which the preset text message includes a slide bar to be operated by the message destination.

[Supplementary Note 9]

The information processing system according to any one of Supplementary Notes 1 to 8, further including a message display unit that changes a method of displaying the preset text message received by the message destination in accordance with a state of the preset text message.

[Supplementary Note 10]

The information processing system according to Supplementary Note 9, in which the state of the preset text message is a degree of importance of the preset text message.

[Supplementary Note 11]

The information processing system according to Supplementary Note 9 or 10, in which the preset text message includes a check box to be checked by the message destination, and the message display unit changes a manner of displaying the received preset text message in accordance with a checked item of the check box included in the reply preset text message.

[Supplementary Note 12]

A linkage server including:

a selection unit that acquires business-operation information, and selects a preset text message corresponding to the acquired business-operation information from among plural preset text message stored in advance;

a determining unit that determines a message destination corresponding to the business-operation information; and a generating unit that generates a message transmission screen for transmitting the preset text message selected by the selection unit to the message destination determined by the determining unit.

[Supplementary Note 13]

The linkage server according to Supplementary Note 12, further including a message display unit that changes a method of displaying the preset text message received by the message destination in accordance with a state of the preset text message.

[Supplementary Note 14]

An information processing method performed by at least one computer and including:

acquiring business-operation information;

selecting a preset text message corresponding to the acquired business-operation information from among plural preset text messages stored in advance;

determining a text-message destination using at least a part of the acquired business-operation information; and transmitting the selected preset text message to the determined destination.

[Supplementary Note 15]

A program that causes a computer to:

acquire business-operation information;

select a preset text message corresponding to the acquired business-operation information from among plural preset text message stored in advance;

determine a text-message destination using at least a part of the acquired business-operation information; and transmit the selected preset text message to the determined destination.

[Supplementary Note 16]

A computer-readable storage medium that stores a program for causing a computer to:

acquire business-operation information;

select a preset text message corresponding to the acquired business-operation information from among plural preset text messages stored in advance;

determine a text-message destination using at least a part of the acquired business-operation information; and transmit the selected preset text message to the determined destination.

The present application claims priority based on Japanese Patent Application No. 2010-135519 filed in Japan on Jun. 14, 2010, the disclosures of which are incorporated herein by reference in their entirety.

The invention claimed is:

1. An information processing system, comprising:
   at least one computer comprising at least one memory storing instructions and at least one central processing unit to execute the instructions, wherein the instructions comprise:
   an acquiring logic to acquire business-operation information in response to a request from a mobile terminal;
   a storage logic to store a plurality of preset text messages;
   a selection logic to select a preset text message corresponding to the business-operation information acquired by the acquiring logic from among the plurality of preset text messages;
   a determining logic to determine a message destination corresponding to the business-operation information acquired by the acquiring logic; and
   a transmitting logic to read a product code from a product, acquire product information based on the read product code, generate a message to be transmitted based on the selected preset text message and the acquired product information, and transmit the generated message to the message destination determined by the determining logic,
   wherein the business-operation information includes information indicating details of a business operation, and
   wherein the selection logic further selects the preset text message corresponding to the information indicating details of the business operation.

2. The information processing system according to claim 1, further comprising:
   a business-operation server including the acquiring logic;
   a text message server including the storage logic; and
   a linkage server including the determining logic.

3. The information processing system according to claim 2, wherein the text message server further includes the selection logic.

4. The information processing system according to claim 2, wherein the business-operation server further includes the selection logic.

5. The information processing system according to claim 2, wherein the linkage server further includes the selection logic.

6. The information processing system according to claim 1, wherein the preset text message includes an option to be selected by the message destination.

7. The information processing system according to claim 1, wherein the preset text message includes a check box to be checked by the message destination.

8. The information processing system according to claim 1, wherein the generated message includes a slide bar to be operated by the message destination.

9. The information processing system according to claim 1, further comprising a message display logic that is configured to change a method of displaying the generated message received by the message destination in accordance with a state of the generated message.

10. The information processing system according to claim 9, wherein the state of the generated message comprises a degree of importance of the generated message.

11. The information processing system according to claim 10, wherein the generated message includes a check box to be checked by the message destination, and wherein the message display logic is further configured to change a manner of displaying the received generated message in accordance with a checked item of the checked box included in a reply preset text message.

12. An information processing method performed by at least one computer and including:
   acquiring business-operation information;
   selecting a preset text message corresponding to the acquired business-operation information from among a plurality of preset text messages stored in advance;
   determining a text-message destination using at least a part of the acquired business-operation information; and
   reading a product code from a product, acquiring product information based on the read product code, generating a message to be transmitted based on the selected preset text message and the acquired product information, and transmitting generated message to the determined destination,
   wherein the business-operation information includes information indicating details of a business operation, and
   wherein said selecting includes selecting the preset text message corresponding to the information indicating details of the business operation.

13. A non-transitory computer-readable storage medium that stores a program for causing a computer to:
   acquire business-operation information;
   select a preset text message corresponding to the acquired business-operation information from among a plurality of preset text messages stored in advance;
   determine a text-message destination using at least a part of the acquired business-operation information; and
   read a product code from a product, acquire product information based on the read product code, generate a message to be transmitted based on the selected preset text message and the acquired product information, and transmit the generated message to the determined destination,
   wherein the business-operation information includes information indicating details of a business operation, and
   wherein the preset text message is selected to correspond to the information indicating details of the business operation.

14. The information processing system according to claim 2, wherein the generated message includes an option to be selected by the message destination.

15. The information processing system according to claim 3, wherein the generated message includes an option to be selected by the message destination.

16. The information processing system according to claim 4, wherein the generated message includes an option to be selected by the message destination.

17. The information processing system according to claim 5, wherein the generated message includes an option to be selected by the message destination.

18. The information processing system according to claim 2, wherein the generated message includes a check box to be checked by the message destination.

* * * * *